United States Patent [19]
Kato et al.

[11] Patent Number: 5,070,465
[45] Date of Patent: Dec. 3, 1991

[54] VIDEO IMAGE TRANSFORMING METHOD AND APPARATUS

[75] Inventors: Tetsuro Kato, Kanagawa; Yoshiyuki Nakamura, Tokyo, both of Japan

[73] Assignee: Sony Corporation, Tokyo, Japan

[21] Appl. No.: 158,922

[22] Filed: Feb. 22, 1988

[30] Foreign Application Priority Data

| Feb. 25, 1987 | [JP] | Japan | 62-42292 |
| Feb. 25, 1987 | [JP] | Japan | 62-42293 |
| Feb. 28, 1987 | [JP] | Japan | 62-46421 |

[51] Int. Cl.⁵ .............................................. G06F 15/46
[52] U.S. Cl. .................................. 395/141; 340/728; 340/750; 382/44
[58] Field of Search ...................... 364/518, 521, 522; 340/723, 728, 747, 750, 707, 724; 382/25, 41, 44

[56] References Cited

U.S. PATENT DOCUMENTS

| 4,680,720 | 7/1987 | Yoshii et al. | 364/521 |
| 4,712,185 | 12/1987 | Aoki | 364/518 |
| 4,751,660 | 6/1988 | Hedley | 364/518 |
| 4,755,954 | 7/1988 | Netter | 364/518 |
| 4,774,678 | 9/1988 | David et al. | 364/518 |
| 4,779,210 | 10/1988 | Katsura et al. | 364/521 |
| 4,791,581 | 12/1988 | Ohba | 364/521 |
| 4,797,836 | 1/1989 | Witek et al. | 364/518 |
| 4,837,563 | 6/1989 | Mansfield et al. | 340/732 |

*Primary Examiner*—Heather R. Herndon
*Assistant Examiner*—Phu K. Nguyen
*Attorney, Agent, or Firm*—Philip M. Shaw, Jr.

[57] ABSTRACT

An image transforming method and apparatus divides an input image into a plurality of original minute rectangular segments. Calculations are performed to determine the positions of the four apexes of a new minute rectangular segment to which each of the original minute rectangular segments is to be transformed. The new minute rectangular segment is divided by a diagonal line into two triangular sections. The coordinates on the input image corresponding to the respective pixels in each of the triangular sections by interpolation using two of the sides of the triangular section except for the side made by the diagonal line used in dividing the new minute rectangular segment. The input image data are mapped on the corresponding output image based on the obtained coordinates.

5 Claims, 17 Drawing Sheets

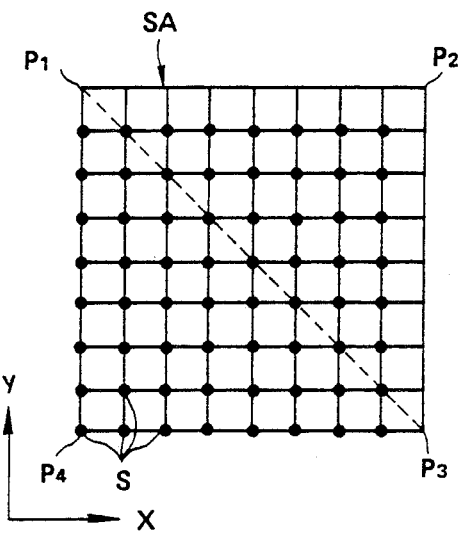
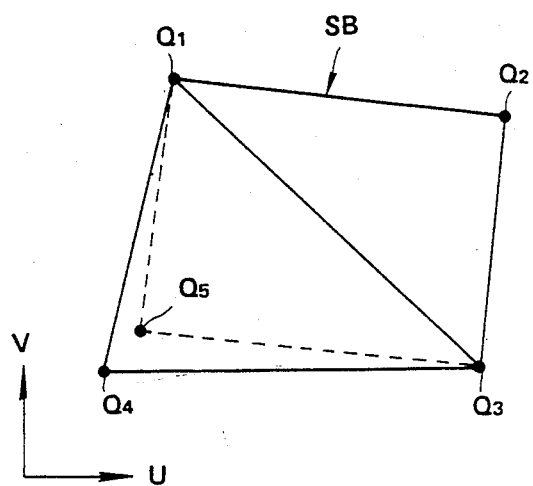
FIG.1A  FIG.1B
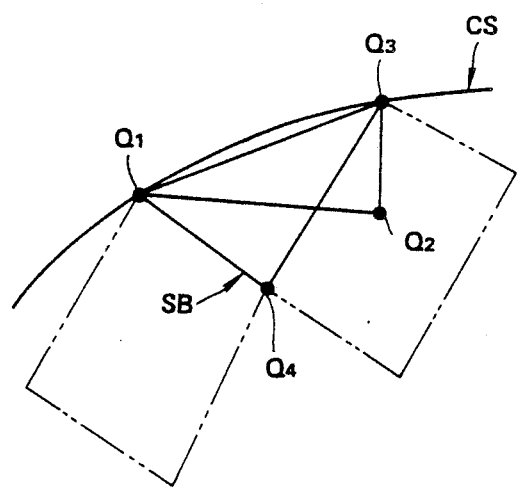
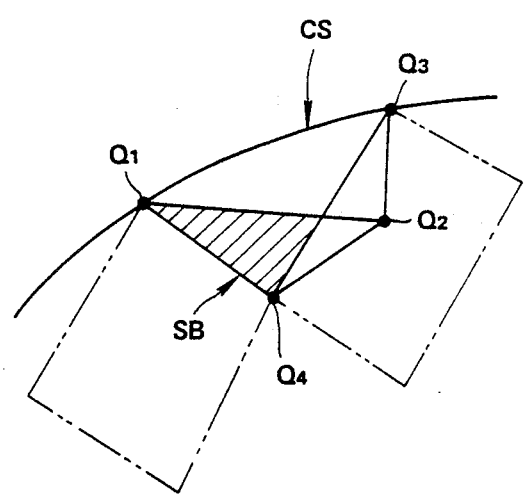
FIG.2  FIG.3

| DELAY | 0T | 1T | 2T | 3T | 4T | 5T | 6T | 7T | 8T |
|---|---|---|---|---|---|---|---|---|---|
| FIG. 22 | −0.5 | 1 | −0.5 | 1 | 0 | 0 | 0 | 0 | 0 |
| FIG. 23 | 0.13 | −0.75 | 1.25 | −0.75 | 0.13 | 0 | 0 | 0 | 0 |
| FIG. 24 | −0.06 | 0.31 | −1.06 | 1.62 | 0.31 | −0.06 | 0 | 0 | 0 |
| FIG. 25 | 0.03 | −0.19 | 0.56 | −1.44 | 2.06 | −1.44 | 0.56 | −0.19 | 0.03 |

VIDEO IMAGE TRANSFORMING METHOD AND APPARATUS

BACKGROUND OF THE INVENTION

This invention relates to a method and apparatus for image transformation and, more particularly, to a method and apparatus employing image memories for geometrical transformation of an input image.

In general, special effect or animation forming equipment requires an image transforming apparatus for rotating, enlarging, reducing, and geometrically transforming an original image. The image transforming apparatus divides the original image into a plurality of original minute rectangular segments each including a plurality of sampling points positioned on a discrete X-Y rectangular coordinate system. Each of the original minute rectangular segments is represented by a predetermined point positioned in the corresponding original minute rectangular segment. The new position to which the representative point is to be transformed on a discrete U-V coordinate system is calculated from a transformation equation. Following this, the new position of the representative point is used to determine the new minute rectangular segment corresponding to the original minute rectangular segment from the transformation equipment. Subsequently, the inverse function of the transformation equation is used to obtain the positions of the sampling points in the original minute rectangular segment corresponding to the respective sampling points in the new minute rectangular segment. The original image is transformed into an output image by regarding the image information of the sampling points in the original minute rectangular segment as the image information of the corresponding sampling points in the new minute rectangular segment.

When the new minute rectangular segments are approximated by a parallelogram transformed in accordance with another transformation equation, the possibility exists that an empty space may be produced between adjacent new minute rectangular segments. In order to avoid this problem, it is the conventional practice to multiply a correction coefficient greater than 1 during the process for obtaining the new minute rectangular segment corresponding to the original minute rectangular segment. For example, Japanese Patent Kokai No. 60-59474 discloses an image transforming method where an input image is divided into a plurality of original minute rectangular segments in such a manner that adjacent original minute rectangular segments share a common portion. Since the new minute rectangular segment is approximated by a parallelogram, however, great errors are introduced which cause image quality deterioration.

When the position of a sampling point in the new minute rectangular segment corresponds to a position on the original minute rectangular segment between two sampling points, linear interpolation is used to obtain the image information of the sampling point in the new minute rectangular segment from the image information of some sampling points in the original minute rectangular segment. However, the value of the image information does not change linearly between sampling points in practice, causing a deviation from the actual image data.

In addition, it is the conventional practice to pass the input image information through longitudinal and lateral filtering devices in order to eliminate aliasing produced in the course of transformation of the input image. However, the filtering devices cannot prevent image quality deterioration when the image is transformed slantingly.

When the input image is transformed to be projected on a three-dimensional body such as a sphere, a cylinder, or other polyhedral bodies, the new minute rectangular segment would be divided into two portions projected on the visible and hidden surfaces of the three-dimensional curved surface near the contour between the visible and hidden surfaces. In this case, the image display is deteriorated on the contour.

SUMMARY OF THE INVENTION

It is a main object of the invention to realize image transformation with simple calculations.

Another object of the invention is to realize image transformation with no empty space between adjacent new minute rectangular segments.

Another object of the invention is to provide good image display on a contour between visible and hidden surfaces of a three-dimensional curved surface on which an input image is mapped.

Another object of the invention is to perform interporation to obtain image information between adjacent sampling points of the input image from the image information of some sampling points of the input image.

Still another object of the invention is to prevent image quality deterioration caused by aliasing during input image transformation.

There is provided, in accordance with the invention, a method for transforming a video image, the method comprising the steps of obtaining respective positions with respect to first coordinates of four vertexes (corners) of respective first small quadrangular regions to be divided from an input video image, obtaining respective positions with respect to second coordinates of four vertexes (corners) of respective second small quadrangular regions to be transformed correspondingly to the first small quadrangular regions by calculating with one or more respective transforming functions, calculating respective parameters corresponding to the relation between the respective first small regions and the respective second small regions according to respective pairs of two vectors being congruent with respective pairs of adjacent two sides of the second small quadrangular regions, the respective pairs of adjacent two sides constituting a pair of triangles together with a diagonal of the quadrangular, and transforming video information at each point within the respective first small regions into video information corresponding point within the respective second small regions according to said respective parameters so as to constitute an output video image.

In another aspect of the invention, there is provided an apparatus for transforming a video image, the apparatus comprising first memory means into which input image data are written according to a first write address signal so as to store the input image data and from which the input image data is read out according to a first read address signal, means for generating the first write address signal, means for obtaining respective positions with respect to each of first coordinates of four vertexes (corners) of respective first small quadrangular regions to be divided from an input video image, means for obtaining respective positions with respect to each of second coordinates of four vertexes (corners) of respective second small quadrangular regions to be transformed correspondingly to the first small quadrangular regions by calculating with one or more respective transforming functions, means for calculating respective parameters corresponding to the relation between the respective first small regions and the respective second small regions according to respective pairs of two vectors being congruent with respective pairs of adjacent two sides of the second small quadrangular regions, the respective pairs of adjacent two sides constituting a pair of triangles together with a diagonal of the quadrangular, second memory means into which output image data are written according to a second write address signal so as to store the output image data and from which the output image data are read out so as to produce output video image data according to a second read address signal, means for generating the second write address signal for respective samples within the respective second small regions and for generating the first read address signal for respective samples within the respective first small regions according to the respective parameters and the second write address signal, and means for generating the second read address signal.

In another aspect of the invention, there is provided an apparatus for producing interpolation data at respective interpolation points to be interpolated between respective sampling points according to the sampling data at the respective sampling points. The apparatus comprises means provided with respective distance data corresponding to respective distances from respective sampling points to respective interpolation points and for producing compensating distance data according to respective distances from respective sampling points to respective interpolation points, calculating means provided with the respective sampling data and the compensating distance data and for producing the respective interpolation data according to the respective sampling data and the compensating distance data, filter means provided with the respective interpolation data and for producing respective output data having a predetermined frequency component from the respective interpolation data, first adding means provided with the respective output data of said filter means and respective weighting data corresponding to the respective distances from the respective sampling points to the respective interpolation points and for adding the respective weights to the respective output data of said filter means so as to produce respective output data, and second adding means provided with the respective interpolation data and the output of said first adding means and for adding together the respective output data of said first adding means and the respective interpolation data.

In another aspect of the invention, there is provided an apparatus for producing interpolation data at respective interpolation points to be interpolated between respective sampling points according to sampling data at the respective sampling points, the apparatus comprises first filtering means having first filter characteristics and provided with the respective sampling data and for filtering the respective sampling data and for producing first output data, second filtering means having second filter characteristics and provided with the respective sampling data and for filtering the respective sampling data and for producing second output data, first interpolation means provided with the first output data of said first filtering means and for producing first interpolation data by a linear interpolation method using the first output data of said first filtering means, second interpolation means provided with second output data of said second filtering means and for producing second interpolation data by a sinusoidal interpolation method using the second output data of said second filtering means, and adding together means for adding the first interpolation data from said first interpolation means and the second interpolation data from said second interpolation means.

In still another aspect of the invention, there is provided an apparatus for filtering an input video image, whereby the input video image is transformed into an output video image. The apparatus comprises a first filtering system having first filtering means for filtering input data thereof in vertical direction and second filtering means for filtering input data thereof in a horizontal direction, the first filtering system being provided with the input video image data and for producing first output data being filtered in the vertical and horizontal directions, a second filtering system having third filtering means for filtering the input data thereof in a first slant direction of left hand side down and right hand side up and fourth filtering means for filtering the input data thereof in a second slant direction of left hand side up and right hand side down, said second filtering system being provided with the input video image data and for producing second data which is filtered in the first and second slant directions, whereby said first to fourth filtering means are controlled in the filter characteristics thereof according to magnitude of transformation. The apparatus also comprises first weighting means for weighting the first output data of said first filtering means and for producing first weighted output signal, second weighting means for weighting the second output data of said second filtering means and for producing a second weighted output signal, whereby said first and second weighting means are controlled in the weighting thereof according to the directions of the transformation. The apparatus also comprises adding means for adding the first weighted output data and the second weighted output data and for producing output video image data.

BRIEF DESCRIPTION OF THE DRAWINGS

The features of this invention which are believed to be novel are set forth with particularly in the appended claims. The invention together with its further objects and advantages thereof, may be best understood, however, by reference to the following description taken in conjunction with the accompanying drawings, in which:

FIG. 1A is a diagram showing one of the original minute rectangular segments into which an input image is divided;

FIG. 1B is a diagram showing a new minute rectangular segment into which the original minute rectangular segment of FIG. 1 is to be transformed;

FIGS. 2 and 3 are diagrams showing new minute rectangular segments positioned on the contour of a three-dimensional curved surface;

DETAILED DESCRIPTION OF THE PREFERRED EMBODIMENTS

Figure 4:
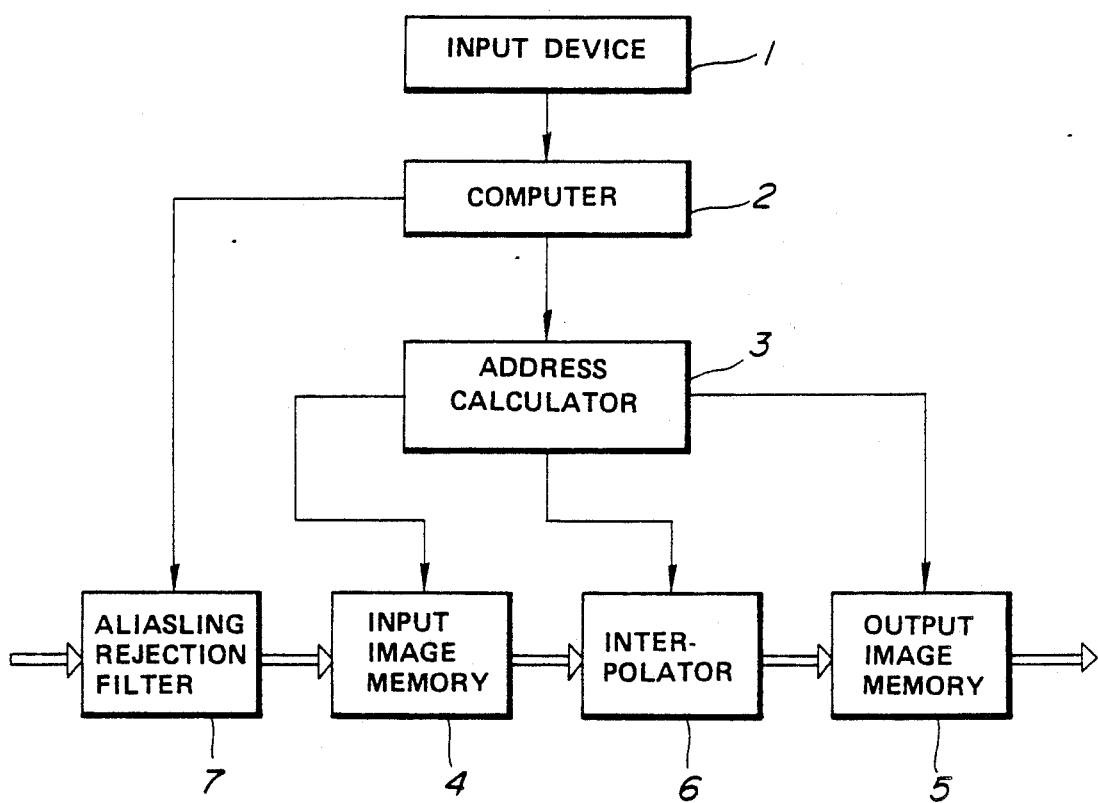
FIG. 4 is a block diagram showing one embodiment of an image transforming apparatus made in accordance with the invention.

With reference now to the drawings, and particularly to FIGS. 1A and 1B, the principles of geometrical transformation of an input image into an output image will be described. First of all, the input image is divided into original minute rectangular or quadrangular segments SA each having four apexes P1 to P4, as shown in FIG. 1A. The original minute rectangular segment SA is formed by a plurality of picture elements or pixels (in the illustrated case $8 \times 8$ pixels) arranged in a Cartesian coordinate system having a horizontal (X) and vertical (Y) axis. The positions of these original pixels are represented as coordinate pairs (x, y). Calculations are made to determine the new minute rectangular segment SB to which the original minute rectangular segment SA is to be transformed or projected on the output image. The new minute rectangular segment SB is formed by a plurality of pixels arranged in a Cartesian coordinate system having a horizontal (U) and vertical (V) axis. The positions of these new pixels are represented as coordinate pairs (u, v). For the purpose of determining the new minute rectangular segment SB, the coordinates (u, v) of the four apexes Q1 to Q2 (see FIG. 1B) of the new minute rectangular segment SB corresponding to the respective apexes P1 to P4 of the original minute rectangular segment SA are calculated. Subsequently, calculations are made to determine the coordinates (x, y) on the input image corresponding to the positions of the respective new pixels of the new minute rectangular segment SB.

According to the invention, the calculations are made by using a diagonal line to divide the new minute rectangular segment SB into two triangular sections and interpolating the coordinates of the original pixels corresponding to the respective new pixels included in each of the triangular sections based on the vectors of two of the three sides of the triangular sections except for the diagonal line used in dividing the new minute rectangular segment SB. Following this, the input image information is mapped onto the output image based on the interpolated coordinates.

For example, when the new minute rectangular segment SB is regarded as a parallelogram having four apexes Q1, Q2, Q3 and Q5, simple linear interpolation can be used to calculate the coordinates on the input image corresponding to the pixels included in the triangular section Q1 Q2 Q3 based on the vectors Q2 Q1 and Q2 Q3 and the coordinates on the input image corresponding to the pixels included in the triangular section Q1 Q4 Q3 based on the vectors Q4 Q1 and Q4 Q3. In other words, it is very easy to provide a correspondence of the parallelogram Q1 Q2 Q3 Q5 to the original minute rectangular (square) segment SA when the vector Q2 Q1 is regarded as an equivalent for the side P2 P1 of the original minute rectangular segment SA and the vector Q2 Q3 is regarded as an equivalent for the side P2 P3 thereof. The input image information is mapped on the triangular section Q1 Q2 Q3 at the positions of the respective pixels located therein based on the coordinates on the input image resulting from interpolation with respect to the pixels located in the rectangular section Q1 Q2 Q3. In this case, the triangular section Q1 Q2 Q3 corresponds to the triangle P1 P2 P3 of the original minute rectangular segment SA. The image information on the respective pixels located in the triangular section Q1 Q2 Q3 can be determined by using the image information of the respective pixels located in the triangle P1 P2 P3. Similar considerations are applied for the triangle Q1 Q4 Q3.

Referring to FIGS. 2 and 3, the manner in which the new minute rectangular segment SB is divided into two triangular sections will be described in connection with the case where the new minute rectangular segment SB of the output image has a portion assigned to the contour of a three-dimentional curved surface CS; that is, the new minute rectangular segment SB is divided into a first portion projected onto the visible surface of the screen and a second portion projected on the hidden surface thereof. It is to be noted that there are two diagonal lines Q1 Q3 and Q2 Q4 which may be used in dividing the new minute rectangular segment SB into two triangular sections. According to the invention, the longer one of these two diagonal lines (in the illustrated case the diagonal line Q1 Q3) is used to divide the new minute rectangular segment SB into two triangular sections Q1 Q2 Q3 and Q1 Q4 Q3. The reason for this is as follows:

As can be seen from a study of FIG. 2, it may be said that when the new minute rectangular segment SB is projected onto the curved surface of a three-dimensional body such as sphere, a cylinder, or the like near its contour between its visible and hidden surfaces, the longer diagonal line is located radially outside of line, i.e. with respect to the center of curvature of the surface CS, so divided by the longer diagonal line can cover a wider area of the visible surface of the screen near the contour. If the shorter diagonal line Q2 Q4, which is generally located radially inside the longer diagonal line Q1 Q3, is used to divide the new minute rectangular segment SB, the resulting triangular section cannot cover the screen near its contour between the visible and hidden surfaces without leaving a relatively large empty space resulting in an uneven pattern along the contour, as shown in FIG. 3.

Assuming now that the apex Q4 of the new minute rectangular segment SB is placed on the visible surface and the apex Q2 thereof is placed on the hidden surface, the triangular section Q1 Q4 Q3 is placed on the visible surface, whereas the triangular section Q1 Q2 Q3 is placed on the hidden surface. In other words, the input image information corresponding to the respective pixels in the triangular section Q1, Q2 Q3 is mapped and displayed on the screen and the input image information corresponding to the respective pixels in the triangular section Q1 Q2 Q3 is not displaced. In FIG. 2, the new minute rectangular segment adjacent to the side Q1 Q4 and the new minute rectangular segment adjacent to the side Q3 Q4 are shown in phantom lines. In such a manner, substantially the whole area of the visible surface of the three-dimentional curved screen CS is covered by a plurality of new minute rectangular segments. If the shorter diagonal line Q2 Q4 is used to divide the new minute rectangular segment SB into two triangular sections, as shown in FIG. 3, the image information corresponding to the pixels of the triangular section Q3 Q2 Q4 including the apex Q2 is not displayed and only a portion (indicated by the hatched area of FIG. 3) of the image information corresponding to the pixels of the triangular section Q1 Q2 Q4 is displayed since adjacent new minute rectangular segments are displayed as indicated in phantom lines.

Accordingly, it is preferable to improve the image quality by using the longer diagonal line to divide the new minute rectangular segment near the contour between the visible and hidden surfaces of a three-dimensional curved screen. It is to be noted that such a dividing technique is not necessary for new minute rectangular segments away from the contour between the visible and hidden surfaces. However, it is preferable to simplify the transforming process by applying the dividing technique also to the new minute rectangular segments away from the contour.

Referring to FIG. 4, there is illustrated one embodiment of an image transforming apparatus made in accordance with the invention. The image transforming apparatus includes an input device 1 by which an operator inputs image transforming information. The input device 1 is connected to a computer 2 which divides an input image into a plurality of original minute rectangular segments SA based on the inputted transforming information, calculates the coordinates of the four apexes of a new minute rectangular segment SB to which the four apexes of each of the original minute rectangular segments SA are to be transformed so as to determine the corresponding new minute rectangular segment SB. The computer 2 then divides the new minute rectangular segment SB into two triangular sections by a diagonal line. When the new minute rectangular segment is placed on the contour between the visible and hidden surfaces of a three-dimensional curved screen, the longer of the two diagonal lines is used to divide the new minute rectangular segment SB into two triangular sections. The computer 2 calculates transformation parameters used in obtaining sampling points in the original minute rectangular segment SA corresponding to the sampling points in one of the triangular sections and transformation parameters used in obtaining sampling points in the original minute rectangular segment SA corresponding to the sampling points in the other triangular section.

The computer 2 is connected to an address calculator 3 which calculates read addresses used in reading input image information stored in an input image memory 4 and write addresses used in writing the read image information into an output image memory 5. The calculations are made based on the calculated coordinates of the four apexes of the new minute rectangular segment and the calculated transformation parameters.

The address calculator 3 is connected to an interpolator 6 which interpolates the image information to be written into the output image memory 5 based on the image information read from the input image memory 4 and interpolation data fed thereto from the address calculator 3. The numeral 7 designates an aliasing elimination filter which filters an input image based on the transforming information, such as transforming direction data fed from the computer 2, to avoid aliasing, which may occur in the course of transformation of the image information. The filtered input image is written into the input image memory 4.

The transformation parameters used in transforming an input image into an output image are calculated as follows: The four apexes P1 to P4 of the original minute rectangular segment SA (FIG. 1A) are transformed in accordance with an equation for transformation from an X-Y rectangular coordinate system onto a U-V rectangular coordinate system. This equation is represented as:

$$(u, v) = \psi(x, y) \tag{1}$$

FIG. 1B shows a new minute rectangular segment SB to which the original minute rectangular segment SA (FIG. 1A) is to be transformed in accordance with Equation (1).

Following this, the new minute rectangular segment SB is divided by a diagonal line Q1 Q2 into two triangular sections Q1 Q2 Q3 and Q1 Q3 Q4. The triangles P1 P3 P4 and P1 P2 P3 (FIG. 1A) are transformed to the triangular sections Q1 Q3 Q4 and Q1 Q2 Q3 (FIG. 1B), respectively. When the apexes P4 and Q4 are at the origins (o, o) of the respective coordinate systems, the vector P4P1 is transformed to the vector Q4Q1 and the vector P4P3 is transformed to the vector Q4Q3. Assuming now that the coordinates of the apexes P1, P3, Q1 and Q3 are (Plx, Ply), (P3x, P3y), (Q1u, Q1v) and (Q3u, Q3v), respectively, the vector Q4Q1 is represented as:

$$\begin{pmatrix} Q_{1u} \\ Q_{1v} \end{pmatrix} = \begin{pmatrix} a & b \\ c & d \end{pmatrix} \begin{pmatrix} P_{1x} \\ P_{1y} \end{pmatrix} \quad (2)$$

and the vector Q4Q3 is represented as:

$$\begin{pmatrix} Q_{3u} \\ Q_{3v} \end{pmatrix} = \begin{pmatrix} a & b \\ c & d \end{pmatrix} \begin{pmatrix} P_{3x} \\ P_{3y} \end{pmatrix} \quad (3)$$

A point (Px, Py) in the triangle P1 P3 P4 is transformed to a point (Qu, Qv) in the triangular section Q1 Q3 Q4 in accordance with the following equation:

$$\begin{pmatrix} Q_u \\ Q_v \end{pmatrix} = \begin{pmatrix} a & b \\ c & d \end{pmatrix} \begin{pmatrix} P_x \\ P_y \end{pmatrix} \quad (4)$$

The coordinates of a point in the triangle P1 P3 P4, the point corresponding to the point (Qu, Qv) in the triangle section Q1 Q3 Q4 can be calculated as:

$$\begin{pmatrix} P_x \\ P_y \end{pmatrix} = \begin{pmatrix} a & b \\ c & d \end{pmatrix}^{-1} \begin{pmatrix} Q_u \\ Q_v \end{pmatrix} \quad (5)$$

Similarly, the vector P2P1 is transformed to the vector Q2Q1 and the vector P2P3 transformed to the vector Q2Q3. When the apexes P2 and Q2 are at the origins (o, o) of the respective coordinate systems, the vector Q2Q1 is represented as:

$$\begin{pmatrix} Q_{1u} \\ Q_{1v} \end{pmatrix} = \begin{pmatrix} a' & b' \\ c' & d' \end{pmatrix} \begin{pmatrix} P_{1x} \\ P_{1y} \end{pmatrix}$$

and the vector Q2Q3 is represented as:

$$\begin{pmatrix} Q_{3u} \\ Q_{3v} \end{pmatrix} = \begin{pmatrix} a' & b' \\ c' & d' \end{pmatrix} \begin{pmatrix} P_{3x} \\ P_{3y} \end{pmatrix}$$

A point (Px, Py) in the triangle P1 P2 P3 is transformed to a point (Qu, Qv) in the triangular section Q1 Q2 Q3 in accordance with the following equation:

$$\begin{pmatrix} Q_u \\ Q_v \end{pmatrix} = \begin{pmatrix} a' & b' \\ c' & d' \end{pmatrix} \begin{pmatrix} P_x \\ P_y \end{pmatrix} \quad (6)$$

The coordinates of a point in the triangle P1 P2 P3, the point corresponding to the point (Qu, Qv) in the triangle section Q1 Q2 Q3 can be calculated as:

$$\begin{pmatrix} P_x \\ P_y \end{pmatrix} = \begin{pmatrix} a' & b' \\ c' & d' \end{pmatrix}^{-1} \begin{pmatrix} Q_u \\ Q_v \end{pmatrix} \quad (7)$$

As described above, the transformation matrixes $$\begin{pmatrix} a & b \\ c & d \end{pmatrix}^{-1} \text{ and } \begin{pmatrix} a & b \\ c & d \end{pmatrix}^{-1}$$

are used as the transformation parameters to determine the positions in the rectangles P1 P2 P3 and P1 P3 P4 corresponding to the pixels in the triangular sections Q1 Q2 Q3 and Q1 Q3 Q4.

Figure 5:
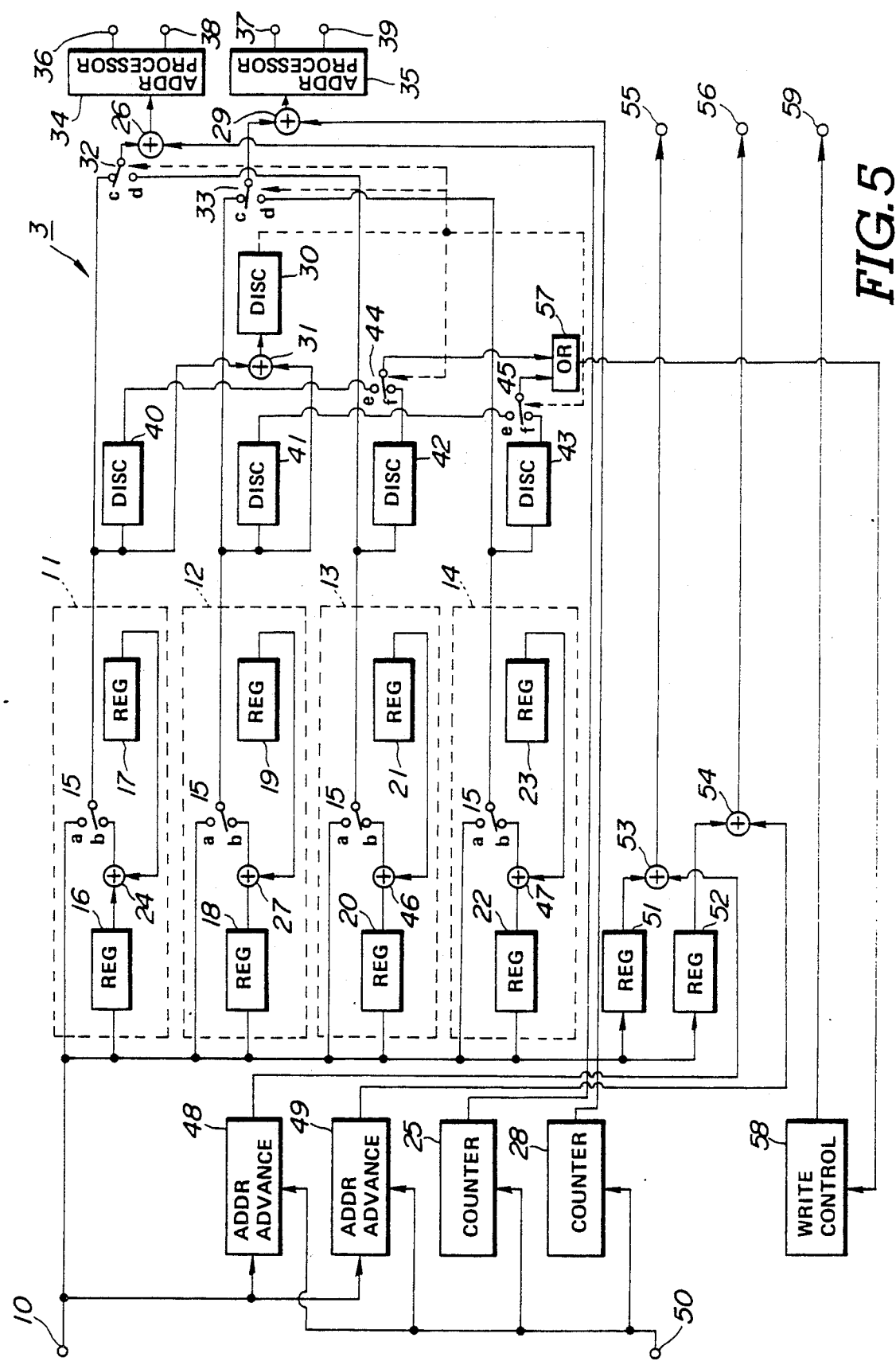
FIG. 5 is a block diagram showing the address calculator circuit of FIG. 4.

Referring to FIG. 5, the address calculator 3 includes an input terminal 10 to which data are fed from the computer 2 in a time sharing fashion. The data include the transformation parameters and the reference point; that is, one of the four apexes of the new minute rectangular segment. The data are fed from the input terminal 10 to four address data forming circuits 11, 12, 13 and 14. The first address data forming circuit 11 produces a data signal indicative of address data used in calculating the vertical addresses on the input image corresponding to the respective addresses of the sampling points in one of the triangular sections into which the new minute rectangular segment SB is divided. The second address data forming circuit 12 produces a data signal indicative of address data used in calculating the horizontal addresses on the input image corresponding to the respective addresses of the sampling points in the one triangular section. The third address data forming circuit 13 produces a data signal indicative of address data used in calculating the vertical addresses on the input image corresponding to the respective addresses of the sampling points in the other triangular section. The fourth address data forming circuit 14 produces a data signal indicative of address data used in calculating the horizontal addresses on the input image corresponding to the respective addresses of the sampling points in the other triangular section.

Each of the address data forming circuits 11, 12, 13 and 14 includes a switch 15a, 15b, 15c, and 15d, respectively. The switches 15a-d are each at a position contacting the contact a at the early stage of the operation during which the transformation parameters are stored as initial values into the respective registers 16, 17, 18, 19, 20, 21, 22 and 23. The switches 15 are changed from the position contacting the contact a to the position contacting the contact b at the subsequent stage of the operation during which actual image transformation is performed. The vertical transformation parameter stored in the register 16 is fed to a summing circuit 24 where it is added to the data stored in the register 17 to form a data signal indicative of address data used in determining the vertical addresses on the input image.

The data signal is fed to a summing circuit 26 where it is added to the data fed from a block counter 25. The data indicate the vertical address of the reference point of the original minute rectangular segment. Therefore, the summing circuit 26 provides vertical address data used in reading the image information stored in the input image memory 4. The horizontal transformation parameter stored in the register 19 is fed to a summing circuit 27 to form a data signal indicative of address data used in determining the horizontal addresses on the input image. This data signal is fed through the switch 15b and a contact c of a switch 33 to a summing circuit 29 where it is added to the data fed from a block counter 28. The data indicate the horizontal address of the reference point of the original minute rectangular segment. Therefore, the summing circuit 29 provides horizontal address data used in reading the image information stored in the input image memory 4. In a similar manner outputs from the third and fourth address data forming circuits 13 and 14, respectively, are supplied through the contacts d of the switches 32 and 33, respectively, to the summing circuits 26 and 29.

In such a manner, the horizontal and vertical reading addresses on the input image corresponding to the addresses of the respective sampling points in the one rectangular section are obtained.

The address calculator 3 also includes a summing circuit 31 and a discriminating circuit 30. The summing circuit 31 adds the data signal fed thereto from the first address data forming circuit 11 to the data signal fed thereto from the second address data forming circuit 12 to provide an added signal. The discriminating circuit 30 determines whether or not the address data produced from the summing circuits 24 and 27 correspond to the respective sampling points in the one triangular section. This determination is made based on the fact that the added signal fed from the summing circuit 31 is less than a predetermined value. If the descriminating circuit 30 determines that the address data produced from the summing circuits 24 and 27 do not correspond to the respective sampling points in the one triangular section, it changes switches 32 and 33 to the positions contacting the contact d so that the address data signals produced from the third and fourth address data forming circuits 13 and 14 can be used in determining the vertical and horizontal addresses on the input image corresponding to the addresses of the recpective sampling points on the other triangular section.

The transformation parameter $$\begin{pmatrix} a & b \\ c & d \end{pmatrix}^{-1}$$

fed from the input terminal 10 is loaded in the registers 16 and 18 of the respective address data forming circuits 11 and 12. The transformation parameter $$\begin{pmatrix} a & b \\ c & d \end{pmatrix}^{-1}$$

fed from the input terminal 10 is also loaded in the registers 20 and 22 of the respective address data forming circuits 13 and 14.

The address calculator 3 also includes first and second address processors 34 and 35. The first address processor 34 receives the vertical read address data from the summing circuit 26. When the vertical read address on the input image is intermediate between the addresses of the respective cells of the input image memory 4, the first address processor 34 produces an output signal at its output terminal 36. This output signal indicates the addresses of the respective memory cells located near the read address. When the vertical read address on the input image coincides with the address of at least one of the cells of the input image memory 4, the first address processor 34 produces an output signal at the output terminal 36. This output signal indicates the image information stored in the cell. The first address processor 34 produces an output signal at its output terminal 38. This output signal indicates interpolation data used in interpolating the image information read from the input image memory 4. The second address processor 35 receives the horizontal read address data from the summing circuit 29. When the horizontal read address on the input image is intermediate between the addresses of the respective cells of the input image memory 4, the second address processor 35 produces an output signal at its output terminal 37. This output signal indicates the addresses of the respective memory cells located near the read address. When the horizontal reading address on the input image coincides with the address of at least one of the cells of the input image memory 4, the second address processor 35 produces an output signal at the output terminal 37. This output signal indicates the image information stored in the cell. The second address processor 35 produces an output signal at its output terminal 39. This output signal indicates interpolation data used in interpolating the image information read from the input image memory 4.

The address data forming circuits 11, 12, 13 and 14 are also connected respectively to discriminating circuits 40, 41, 42 and 43 which determine whether the address data fed from the respective summing circuits 24, 27, 46 and 47 correspond to the sampling points in the new minute rectangular segment. Switches 44 and 45 operate based on the output signal fed thereto from the discriminating circuit 30. The switches 44 and 45 are each at their positions contacting the contacts e when the address data produced from the summing circuits 24 and 27 correspond to the sampling points in the one triangular section. The switches 44 and 45 are changed to the position contacting the contact f when the address data produced from the summing circuits 24 and 27 correspond to the sampling points in the other triangular section.

A description will now be given of the circuit for forming the write address data used in writing the image information into the output image memory 5. An address advance circuit 48 successively advances the vertical address at a rate determined by the data fed thereto from the input terminal 10. An address advance circuit 49 successively advances the horizontal address at a rate determined by the data fed thereto from the input terminal 10. The address advance circuits 48 and 49 are reset by a vertical synchronizing signal applied thereto from an input terminal 50. Registors 51 and 52 store the vertical and horizontal addresses of the reference point of the new minute rectangular segment inputted from the input terminal 10, respectively. The signal outputted from the register 51 is fed to a summing circuit 53 where it is added to the signal outputted from the address advance circuit 48. The summing circuit 53 produces an output signal indicative of the vertical write address to an output terminal 55. The signal outputted from the register 52 is fed to a summing circuit 54 where it is added to the signal outputted from the address advance circuit 49. The summing circuit 54 produces an output signal indicative of a horizontal write address to an output terminal 56.

The output signals through the switches 44 and 45 are applied to an OR gate 57. The output of the OR gate 57 is coupled to a writing operation control circuit 58 which produces an inhibit signal to prevent the image information from being written into the output image memory 5 when the address data do not correspond to the addresses of the sampling points in the new minute rectangular segment. The inhibit signal is applied from the writing operation control circuit 58 to an output terminal 59 connected to the output image memory 5. The read address signal is applied to the input image memory 4 and the write address signal is applied to the output image memory 5. The interpolator 6 can perform interpolation based on the image information of a plurality of memory cells located near the read addresses to obtain the image information corresponding to pixels on the output image when the horizontal and vertical read addresses outputted from the summing circuits 26 and 29 are intermediate between the addresses of the respective memory cells of the input image memory 4.

Figure 6:
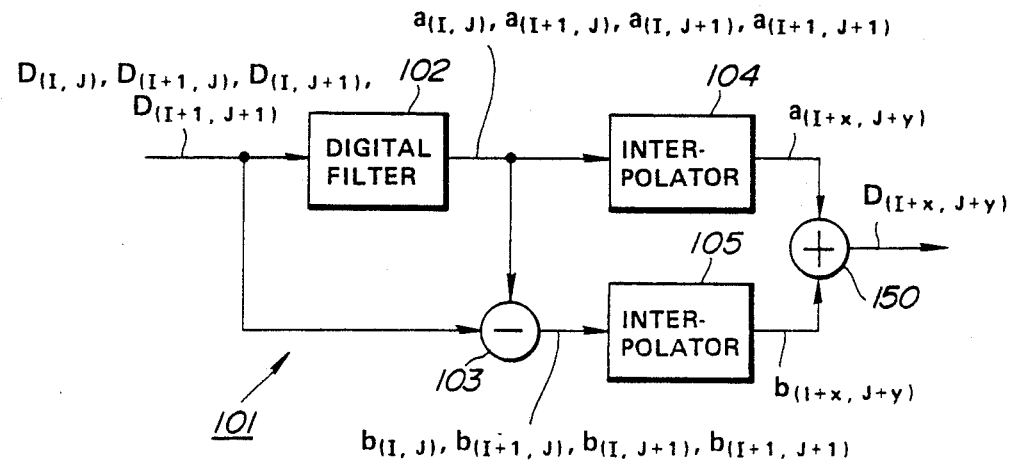
FIG. 6 is a block diagram showing a first form of the interpolator circuit of FIG. 4.

Referring to FIG. 6, the interpolator 6, which is generally designated by the numeral 101, includes a digital filter circuit 102, a subtractor 103, first and second interpolators 104 and 105 and a summing circuit 150. The signal indicative of the information on the four memory cells neighboring the coordinates obtained from the interpolation; that is, the image data D(I, J), D(I+1, J), D(I, J+1) and D(I+1, J+1) of the respective sampling points P(I, J), P(I+1, J), P(I, J+1) and P(I+1, J+1) is applied to the digital filter circuit 102 and also to the subtractor 103. The digital filter circuit 102 is in the form of a two-dimensional digital filter having a predetermined space frequency characteristic F1 ($\omega$) in the directions vertical and horizontal directions of the screen. The sampling data a(I, J), a(I+1, J), a(I, J+1) and a(I+1, J+1) produced from the digital filter circuit 102 are fed to the first interpolator 104 and the subtractor 103. The subtractor 103 provides sampling data b(I, J), b(I+1, J), b(I, J+1) and b(I+1, J+1) represented as:

$$b(I,J) = D(I,J) - a(I,J) \quad (8)$$
$$b(I+1,J) = D(I+1,J) - a(I+1,J) \quad (9)$$
$$b(I,J+1) = D(I,J+1) - a(I,J+1) \quad (10)$$
$$b(I+1,J+1) = D(I+1,J+1) - a(I+1,J+1) \quad (11)$$

The sampling data are fed from the output of the subtractor 103 to the input of the second interpolator 105. The digital filter circuit 102 forms a filter circuit having a space frequency characteristic F1($\omega$) and it is combined with the subtractor 103 to form a filter circuit having a space frequency characteristic F2($\omega$) represented as:

$$F2(\omega) = 1 - F1(\omega) \quad (12)$$

The first interpolator 104 is taken in the form of a linear interpolator which calculates interpolation data a(I+1, J+1) of the point P(I+X, J+y) from the sampling data a(I, J), a(I+1, J), a(I+1, J+1) and a(I, J+1) fed from the digital filter circuit 102, the sampling data corresponding to the image data D(I, J), D(I+1, J), D(I+1, J+1) and D(I, J+1) of the four sampling points P(I, J), P(I+1, J), P(I+1, J+1) and P(I, J+1) adjacent to the point P(I+X, J+y) for which the image data D(I+x, J+y) are to be obtained. The values x and y, which are referred hereinafter to as weighting coefficients, represent the distance of the sampling point P(I+x, J+y) from the sampling point P(I, J). The values x and y are represented as:

$$0 \leq x \leq 1 \quad (13)$$

$$0 \leq y \leq 1 \quad (14)$$

Figure 7:
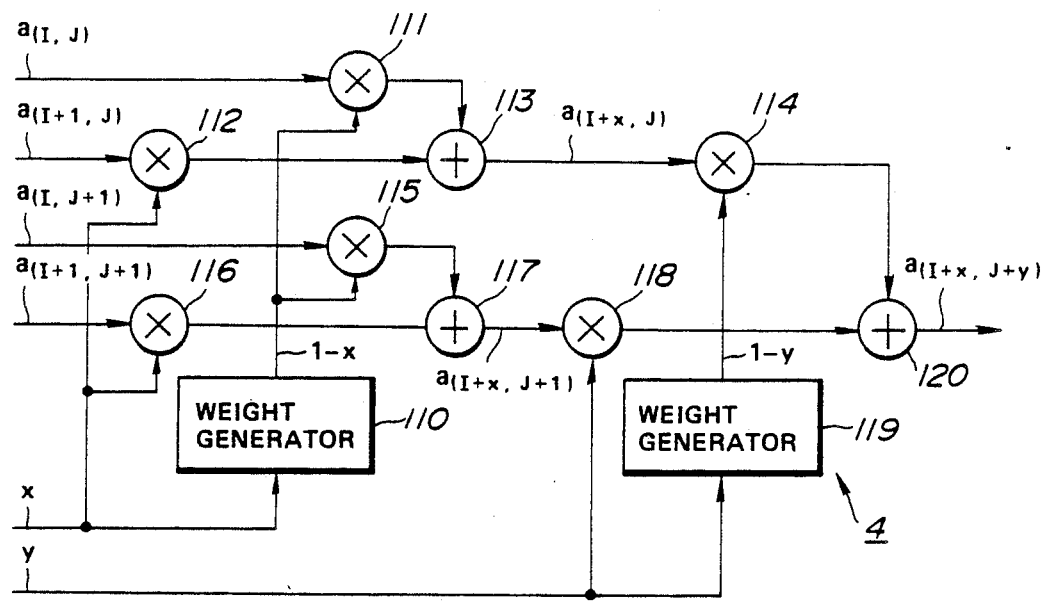
FIG. 7 is a block diagram showing the first interpolator of the interpolator circuit of FIG. 6.

As shown in FIG. 7, the weighting coefficient X is fed to a weighting coefficient generator 110 which produces a weighting coefficient 1−x. The sampling data a(I, J) are fed to a multiplier 111 where they are weighted by the weighting coefficient 1−x fed thereto from the weighting coefficient generator 110 to form interpolation data (1−x) x a(I, J). The sampling data a(I+1, J) are fed to a multiplier 112 where they are weighted by the weighting coefficient X to form interpolation data x x a(I+1, J). The interpolation data (1−x) x a(I, J) and (x) x a(I+1, J) are fed through a summing circuit 113 to a multiplier 114. The multiplier 114 receives interpolation data a(I+x, J) represented as:

$$a(I+x, J) = (1-x) a(I, J) + x a(I+1, J) \quad (15)$$

Figure 8:
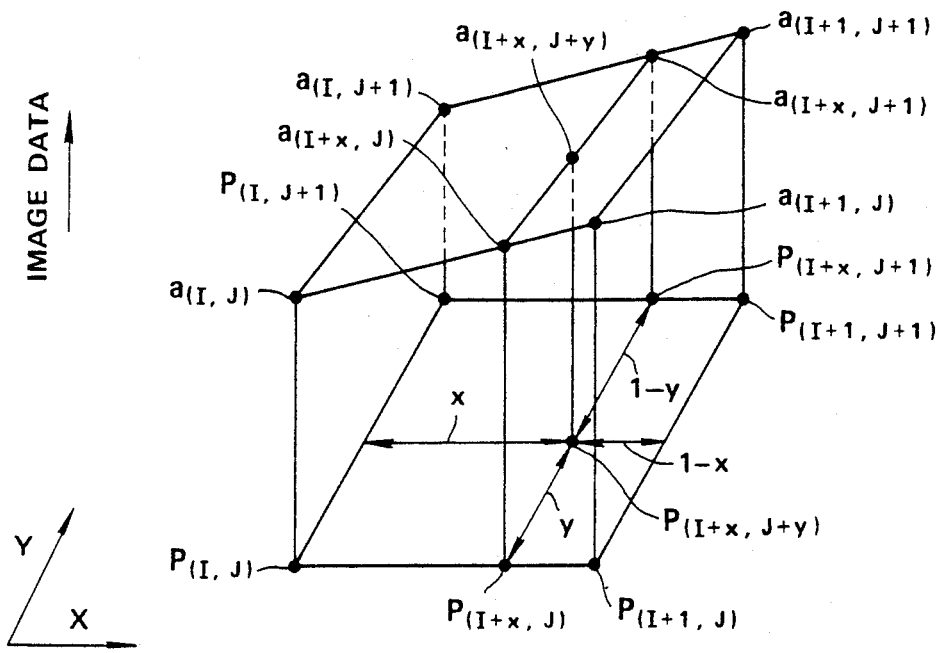
FIGS. 8 and 9 are diagrams used in explaining linear interpolation.
Figure 9:
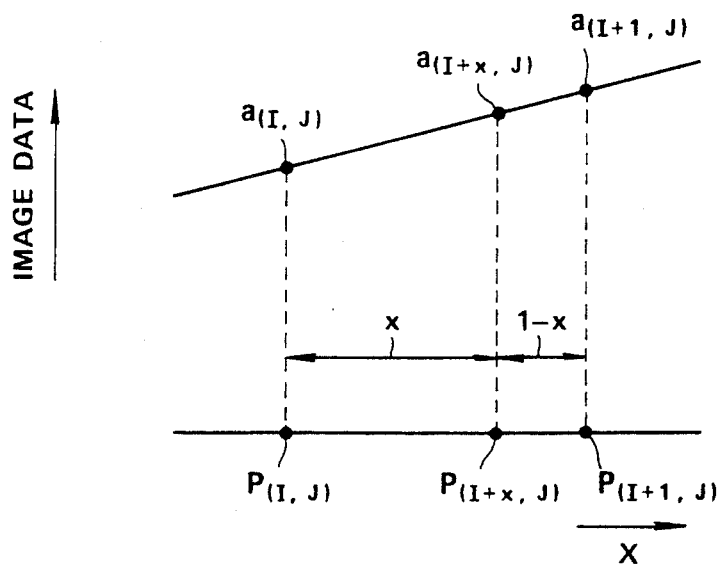

This means that the interpolation data a(I+1, J) of the point P(I+x, J), which divides the line between the points P(I, J) and P(I+1, J) at a ratio of the weighting coefficient X to the weighting coefficient 1−x, as shown in FIGS. 8 and 9, are obtained by using the weighting coefficients 1−x and x to interpolate the sampling data a(I, J) and a(I+1, J) of the sampling points P(I, J) and P(I+1, J) arranged in the horizontal or X direction.

Similarly, the sampling data a(I, J+1) are fed to a multiplier 115 where they are weighted by the weighting coefficient 1−x fed thereto from the weighting coefficient generator 110 to form interpolation data (1−x) x a(I, J+1). The sampling data a(I+1, J+1) are fed to a multiplier 116 where they are weighted by the weighting coefficient x to form interpolation data (x) x a(I+1, J+1). The interpolation data (1−x) x a(I, J+1) and (x) x a(I+1, J+1) are fed through a summing circuit 117 to a multiplier 118. The multiplier 118 receives interpolation data a(I+x, J+y) represented as:

$$a(I+x, J+1) = (1-1x)a(I, J+1) + Xa(I+1, J+1) \quad (16)$$

This means that the interpolation data a(I+1, J+1) of the point P(I+1, J+1), which divides the line between the points P(I, J+1) and P(I+1, J+1) at a ratio of the weighting coefficient x to the weighting coefficient 1−x, are obtained by using the weighting coefficient 1−x and x to interpolate the sampling data a(I, J+1) and a(I+1, J+1) of the sampling points P(I, J+1) and P(I+1, J+1) arranged in the horizontal or X direction.

The weighting coefficient y is fed to a second weighting coefficient generator 119 which produces a weighting coefficient 1−y to the multiplier 114. The multiplier 1114 weights the interpolation data a(I+x, J) by the weighting ceofficient 1−y to form interpolation data (1−y) x a(I+x, J). The interpolation data are fed to a summing circuit 120. The multiplier 118 weights the interpolation data a(I+x, J+y) by the weighting coefficient y to form interpolation data (y) x a(I+x, J+y). The interpolation data are fed to the summing circuit 120. The summing circuit 120 adds the inputted interpolation data to form interpolation data a(I+x, J+y) represented as:

$$a(I + x, J + y) = (1 - y)a(I + x, J) + y\,a(I + x, J + 1) = \qquad (17)$$
$$(1 - y)\{(1 - x)a(I,J) + x\,a(I + 1,J)\} +$$
$$y\{(1 - x)a(I,J + 1) + x\,a(I + 1,J + 1)\}$$

This means that the interpolation data a(I+x, J+y) of the point P(I=1, J+1), which divides the line between the points P(I+x, J) and P(I+x, J+y) at a ratio of the weighting coefficient y to the weighting coefficient 1−y, are obtained by using the weighting coefficients 1−y and y to interpolation the interpolation data a(I+x, J) and a(I+X, J+y) represented respectively by Equations (15) and (16). Therefore, it is possible to obtain the interpolation data a(I+X, J+y) by linear interpolation of the point P(I+X, J+y) surrounded by the four sampling points P(I, J), P(I+1, J), P(I+1, J+1) and P(I, J+1).

The second interpolator 105 forms interpolation data b(I+x, J+y) of a desired point P(I+x, J+y) by sine-curve interpolation made on an assumption that the sampling data b(I, J), b(I+1, J), b(I, J+1) and b(I+1, J+1) of the four sampling points P(I, J), P(I+1, J), P(I, J+1) and P(I+1, J+1) adjacent in the direction horizontal and vertical directions of the screen are placed on a sine curve at positions spaced at an angular distance π/2 away from each other.

Figure 10:
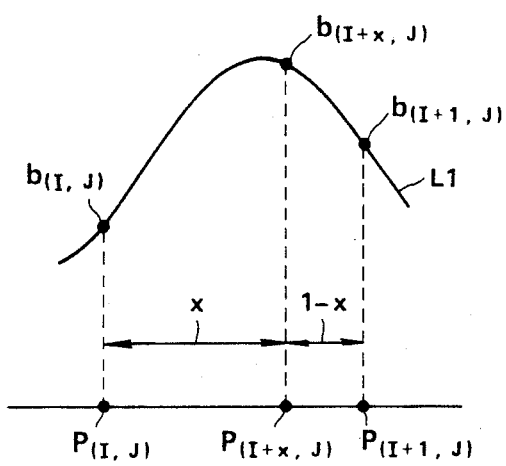
FIGS. 10, 11 and 12 are diagrams used in explaining sinusoidal interpolation.
Figure 11:
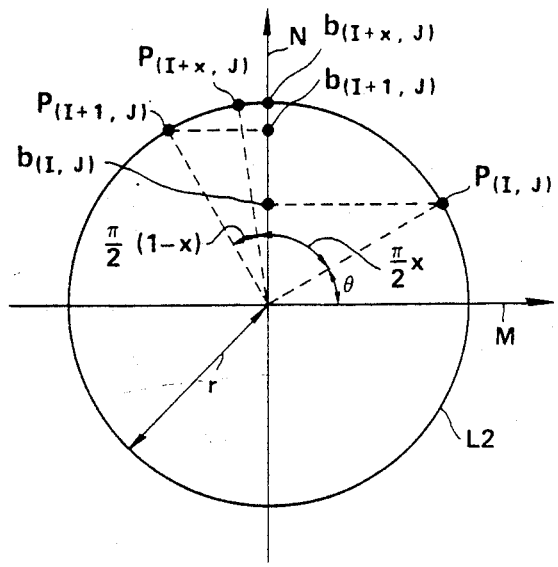

As shown in FIGS. 10 and 11, when the sampling data b(I, J) and b(I+1, J) of the sampling points P(I, J) and P(I+1, J) are placed on a sine curve (indicated by the character L1 in FIG. 10) at positions spaced at an angular distance π/2 away from each other, the sampling data b(I, J) and b(I+1, J) can be plotted on the circumference of a circle (indicated by the character L2 in FIG. 11) having a radius r. Using the N coordinate of the M−N rectangular coordinate system, the values of the sampling data b(I, J) and b(I+1, J) can be represented. That is, the radius r is represented as:

$$r = \sqrt{(b(I,J))^2 + (b(I + 1,J))^2} \qquad (18)$$

The sampling data b(I, J) and b(I+1, J) are represented as:

$$b(I,J) = r\sin\theta$$
$$= \sqrt{(b(I,J))^2 + (b(I + 1,J))^2} \cdot \sin\theta$$
$$b(I + 1,J) = r\sin(\pi/2 + \theta)$$
$$= r\cos\theta$$
$$= \sqrt{(b(I,J))^2 + (b(I + 1,J))^2} \cdot \cos\theta$$

The point P(I+x, J), which results from interpolation of the sampling points b(I, J) and b(I+1, J) spaced at an angular distance π/2 at a ratio of the weighting coefficient 1−x to the weighting coefficient x, is represented at a position spaced at an angular distance (x)×π/2 away from the samping point P(I, J) toward the sampling point P(I+1, J). Accordingly, the interpolation data b(I+x, J) of the point P(I+x, J) is represented as:

$$b_{(I+x, J)} = r\sin\left(\frac{x\pi}{2} + \theta\right) \qquad (21)$$
$$= \sqrt{(b_{(I, J)})^2 + (b_{(I+1, J)})^2} \cdot$$
$$\left(\sin\frac{x\pi}{2}\cos\theta + \cos\frac{x\pi}{2}\sin\theta\right)$$

If Equations (19) and (20) are substituted into Equation (21), we obtain:

$$b_{(I+x, J)} = b_{(I, J)} \cdot \cos\frac{x\pi}{2} + b_{(I+1, J)} \cdot \sin\frac{x\pi}{2} \qquad (22)$$

Figure 12:
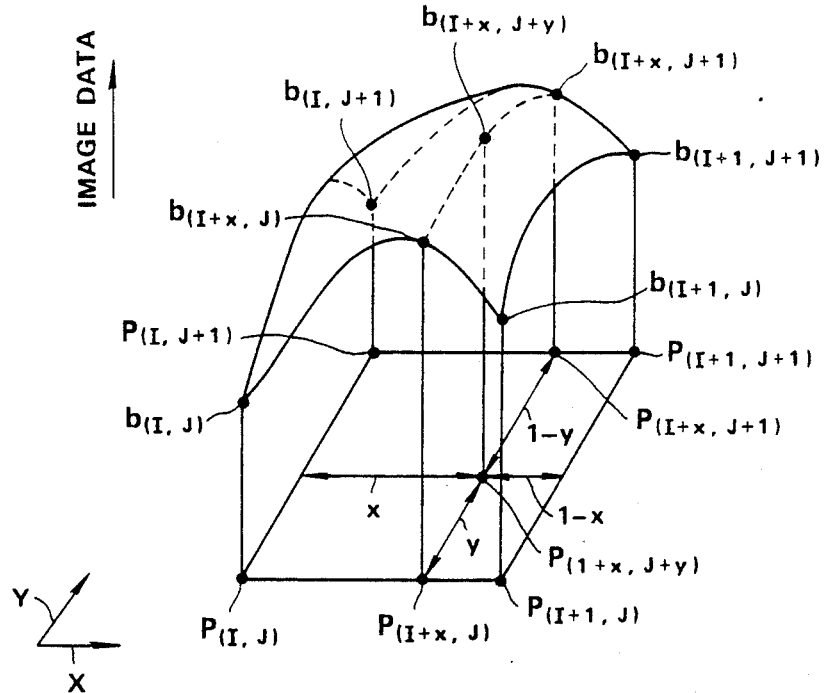

According to this embodiment, therefore, the interpolation data b(I+x, J+y) of the point P(I+X, J+y) is obtained by effecting two-dimensional sine curve interpolation of the sampling data b(I, J), b(I+1, J), b(I+1, J+1) and b(I, J+1) corresponding to the sampling points P(I, J), P(I+1, J), P(I+1, J+1) and P(I, J+1) inputted through the subtractor 103 to the first interpolator, as shown in FIG. 12.

Figure 13:
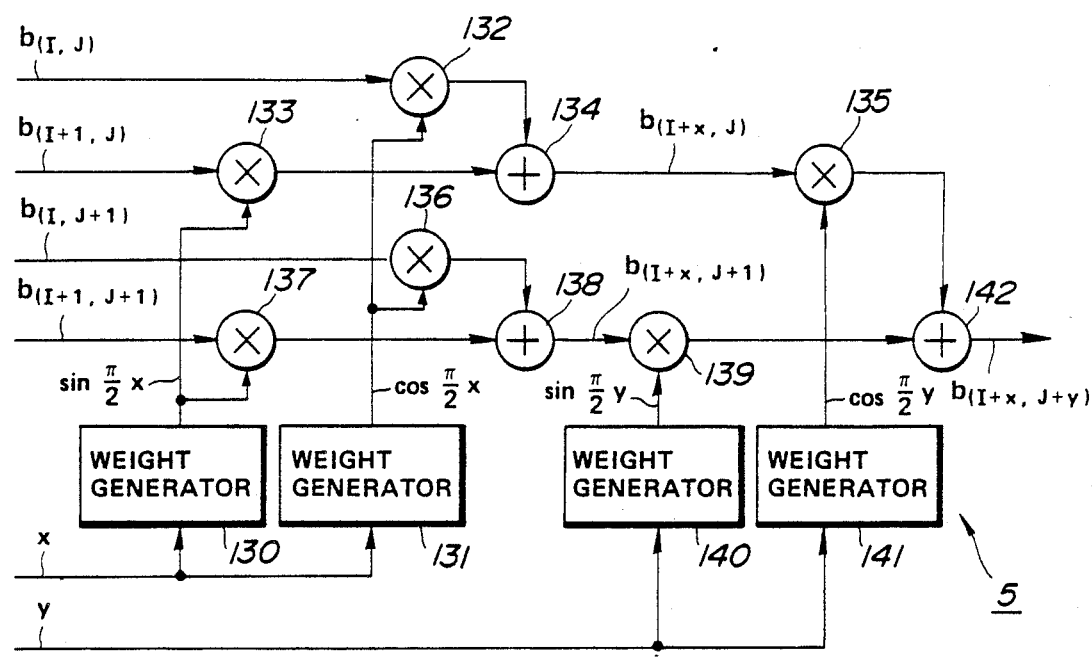
FIG. 13 is a block diagram showing a second form of the interpolator circuit of FIG. 4.

Referring to FIG. 13, the address calculator 5 includes first and second weighting coefficient generators 130 and 131. The first weighting coefficient generator 130 receives the weighting coefficient X and produces a weighting coefficient sin ((x)×π/2). The second weighting coefficient generator 131 receives the weighting coefficient x and produces a weighting coefficient cos ((x)×π/2) or sin {(1−x)×π/2}. The sampling data b(I, J) are fed to a multiplier 132 where they are weighted by the weighting coefficient cos ((x)×π/2) fed from the second weighting coefficient geneator 131. The weighted data are fed through a summing circuit 134. The sampling data b(I+1, J) are fed to a multiplier 133 where they are weighted by the weighting coefficient sin ((x)×π/2) fed thereto from the first weighting coefficient generator 130. The weighted data are fed to the simming circuit 134 where they are added to the data fed from the multiplier 132. The summing circuit 134 produces interpolation data b(I+x, J). The interpolation data b(I+x, J) of the point P(I+x, J), which divides the line between the sampling points P(I, J) and P(I+1, J) at a ratio of the weighting coefficient x to the weighting coefficient 1−x, are obtained by using the weighting coefficients cos ((x)×π/2) and sin ((x)×π/2) to interporate the sampling data b(I, J) and B(I+1, J) of the sampling points (I, J) and (I+1, J), as represented by Equation (21). The interpolation data b(I+x, J) are fed to a multiplier 135.

The sampling data b(I, J+1) are fed to a multiplier 136 where they are weighted by the weighting coefficient cos ((x)×π/2) fed from the second weighting coefficient generator 131. The weighted data are fed to a summing circuit 138. The sampling data b(I+1, J+1) are fed to a multiplier 137 where they are weighted by the weighting coefficient sin ((x)×π/2) fed from the first weighting coefficient generator 130. The weighted data are fed to the summing circuit 138 where they are added to the weighted data fed from the multiplier 136. The summing circuit 138 produces interpolation data b(I+x, J+1). The interpolation data B(I+1, J+1) of the point P(I+x, J+y), which divides the line between the sampling points P(I, J+1) and P(I+1, J+1) at a ratio of the weighting coefficient x to the weighting coefficient 1−x, are obtained by using the weighting coefficients cos $((x) \times \pi/2)$ and sin $((x) \times \pi/2)$ to interpolate the sampling data $b(I, J+1)$ and $b(I+1, J+1)$ of the sampling points $P(I, J+1)$ and $P(I+1, J+1)$. The interpolation data $b(I+1, J+1)$ are represented as:

$$b_{(I+x, J+1)} = b_{(I, J+1)} \cdot \cos \frac{x\pi}{2} + b_{(I+1, J+1)} \cdot \sin \frac{x\pi}{2} \quad (23)$$

The address calculator 5 also includes third and forth weighting coefficient generators 140 and 141. The third weighting coefficient generator 140 receives the weighting coefficient y and produces a weighting coefficient sin $((y) \times \pi/2)$. The fourth weighting coefficient generator 141 receives the weighting coefficient y and produces a weighting coefficient cos $((y) \times \pi/2)$ or sin $\{(1-y) \times \pi/2\}$. The multiplier 135 weights the interpolation data $b(I+x, J)$ by the weighting coefficient cos $((y) \times \pi/2)$ fed thereto from the fourth weighting coefficient generator 141 and produces the weighted data to a summing circuit 142. The multiplier 139 weights the interpolation data $b(I+x, J+y)$ by the weighting coefficient sin $((y) \times \pi/2)$ fed thereto from the third weighting coefficient generator 140 and produces the weighted data to the summing circuit 142 where they are added to the weighted data fed thereto from the multiplier 135 to form interpolation data $b(I+x, J+y)$. The interpolation data $b(I+x, J+y)$ of the point $P(I+x, J+y)$, which divides the line between the points $P(I+x, J)$ and $P(I+x, J+1)$ at a ratio of the weighting coefficient y to the weighting coefficient $1-y$, are obtained by using the weighting coefficients cos $((y) \times \pi/2)$ and sin $((y) \times \pi/2)$ to interpolate the interpolation data $b(I+x, J)$ and $b(I+x, J+1)$ of the points $P(I+x, J)$ and $P(I+x, J+1)$. The interpolation data $b(I+x, J+y)$ are represented as:

$$b_{(I+x, J+y)} = b_{(I+x, J)} \cdot \cos \frac{y\pi}{2} + b_{(I+x, J+1)} \cdot \sin \frac{y\pi}{2} \quad (24)$$

$$= \left\{ b_{(I, J)} \cdot \cos \frac{x\pi}{2} + b_{(I+1, J)} \cdot \sin \frac{x\pi}{2} \right\} \cdot$$

$$\cos \frac{y\pi}{2} + \left\{ b_{(I, J+1)} \cdot \cos \frac{x\pi}{2} + b_{(I+1, J+1)} \cdot \sin \frac{x\pi}{2} \right\} \cdot$$

$$\sin \frac{y\pi}{2}$$

Returning to FIG. 6, the summing circuit 150 successively adds the interpolation data $a(I+x, J+y)$ fed thereto from the first interpolator 104 and the interpolation data $b(I+x, J+y)$ fed thereto from the second interpolator 105 to form image data $D(I+x, J+y)$ of the point $P(I+x, J+y)$ represented as:

$$D_{(I+x, J+y)} = a_{(I+x, J+y)} + b_{(I+x, J+y)} \quad (25)$$

According to this embodiment, the interpolation data $b(I+x, J+y)$ obtained by sine curve interpolation are added to the interpolation data $a(I+x, J+y)$ obtained by linear interpolation. Therefore, it is possible to minimize the deviation of the outputted image data from the image data of the actual sampling point (I, J) as compared to a conventional apparatus. In addition, the sine curve interpolation can be effected merely by using two adjacent sampling points like linear interpolation. Therefore, it is possible to obtain accurate image data $D(I+x, J+y)$ without any increase in the number of sampling points necessary for the interpolation. This results in a simple data processing device.

Figure 14:
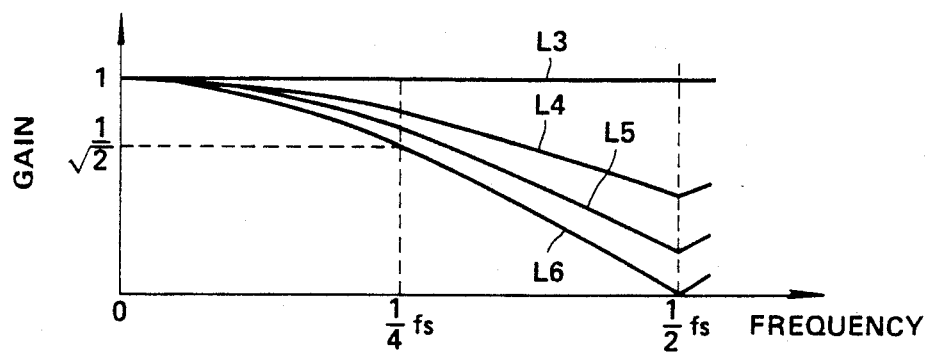
FIG. 14 contains graphs showing the frequency characteristics of the first interpolator circuit.

FIG. 14 contains four graphs L3, L4, L5 and L6 showing the frequency characteristic G1(w) of the first interpolator 104. As can be seen from a study of FIG. 14, the frequency characteristic is degraded at high frequencies in accordance with the values of the weighting coefficients x and y used in obtaining the interpolation data $a(I+x, J+y)$. When the values of the weighting coefficients x and y are zero; that is, when the first interpolator 104 produces interpolation data $a(I+x, J+y)$ of the sampling point (I, J), the first interpolator exhibits a flat frequency characteristic, as indicated by the graph L3, with its gain remaining at 1 regardless of the angular frequency. When both of the weighting coefficients x and y are 0.5; that is, when the first interpolator 104 produces interpolation data $a(I+x, J+y)$ of the point $P(I+x, J+y)$ positioned at the center of the four sampling points $P(I, J)$, $P(I+1, J)$, $P(I+1, J+1)$ and $P(I, J+1)$, the first interpolator has a gain which drops at the highest frequency. When the weighting coefficients x and y are 0.5, the frequency characteristic $G1(\omega)$ is represented as:

$$G1(\omega) = \cos \omega \quad (26)$$

It is apparent from Equation (26) that the gain is $1/\sqrt{2}$ at an angular frequency fs/4 and 0 an angular frequency fs/2, where fs is the sampling or space frequency for the sampling point.

Figure 15:
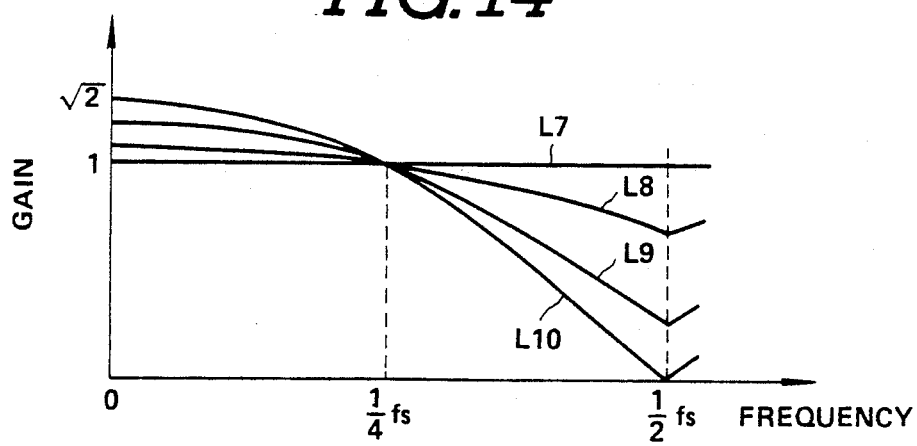
FIG. 15 contains graphs showing the frequency characteristics of the second interpolator circuit.

FIG. 15 contains four graphs L7, L8, L9 and L10 showing the frequency characteristic $G2(\omega)$ of the second interpolator 105. As can be seen from a study of FIG. 15, the frequency characteristic $G2(\omega)$ varies, in accordance with the values of the weighting coefficients x and y, in such a manner that the gain is 1 at an angular frequency fs/4. When both of the weighting coefficients x and y are zero, the second interpolator exhibits a flat frequency characteristic, as indicated by the graph L7, with its gain remaining at 1 regardless of the angular frequency. When both of the weighting coefficients x and y are 0.5, the gain changes greatly in response to space frequency changes. When both of the weighting coefficients x and y are 0.5, the frequency characteristic $G2(\omega)$ is represented as:

$$G2(\omega) = \sqrt{2\cos\omega} \quad (27)$$

It is apparent from Equation (26) that the gain is $1/\sqrt{2}$ at an angular frequency of 0 and the gain is zero at an angular frequency of fs/2.

According to this embodiment, it is possible to obtain image data $D(I+x, J+y)$ having a flat frequency characteristic sufficient for use in practice, even when the weighting coefficient x and y change, by selecting the frequency characteristic $F1(\omega)$ of the digital filter circuit 102 in such a manner that the summing circuit 150 can produce image data $D(I+x, J+y)$ having the flattest frequency characteristic when both of the weighting coefficients x and y are 0.5 where the frequency characteristics $G1(\omega)$ and $G2(\omega)$ of the first and second interpolators 104 and 105 are degraded to the greatest extent. That is, when both of the weighting coefficients x and y are 0.5, image data $D(I+x, J+y)$ having a flat frequency characteristic can be obtained, if the transfer function $H(\omega)$ of the data processor 101 satisfies the following equation:

$$H(\omega) = F1(\omega) \cdot \cos\omega + F2(\omega) \cdot \sqrt{2\cos\omega} \quad (28)$$
$$= 1$$

If Equation (12) is substituted into Equation (28), we obtain:

$$F1(\omega) = \frac{\sqrt{2} - \frac{1}{\cos\omega}}{\sqrt{2} - 1} \quad (29)$$

$$F2(\omega) = \frac{\frac{1}{\cos\omega} - 1}{\sqrt{2} - 1} \quad (30)$$

Figure 16:
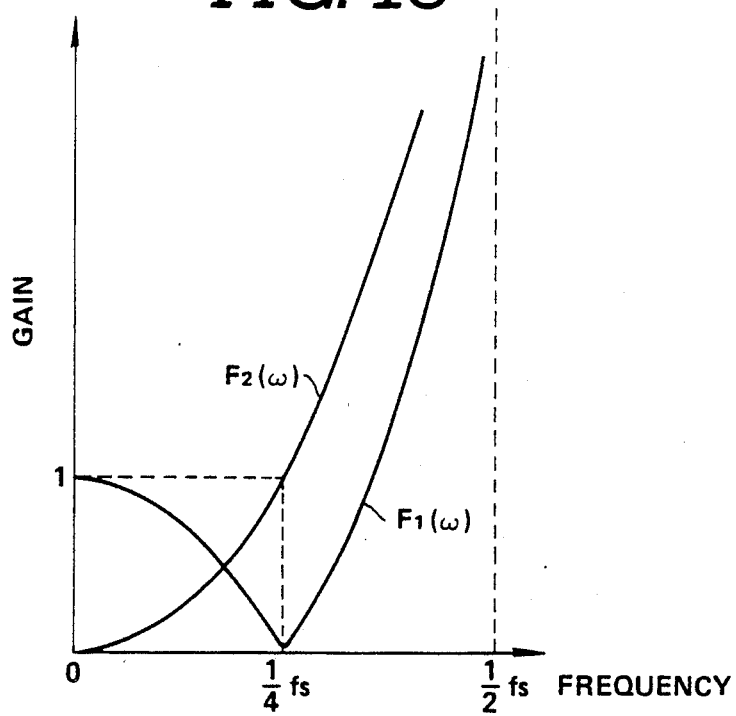
FIG. 16 contains graphs showing the frequency characteristics of the digital filter circuit used in the interpolator circuit.

The frequency characteristic F1($\omega$) of the digital filter circuit 102 and the frequency characteristic F2($\omega$) of the subtractor 103 can be selected as represented by Equations (29) and (30), respectively. This can be attained by using a filter curcuit, as shown in FIG. 6, where the digital filter circuit 102 serves as a low pass filter and the combination of the digital filter 102 and the subtractor 103 serves as a high pass filter when the frequency is less than fs/4 (see FIG. 16) and which has a gain gradually increasing to its maximum value at an angular frequency of fs/2 (see FIG. 16) when the frequency is greater than fs/4 (see FIG. 16). Since the image data contains signal components of frequencies less than fs/2 in practice, the frequency characteristic F1(w) of the digital filter circuit 102 can be selected within a range where the displayed image has a resolving power sufficient in practice.

It was found through experiments that it is possible to reduce the error introduced in the image data D(I+x, J+y) to an extent sufficient in practice and avoid displayed image deterioration by selecting the frequency characteristic F1($\omega$) of the digital filter circuit 102 such that the transfer function H($\omega$) of the data processing circuit 101 is when both of the weighting coefficients x and y are 0.5.

According to this embodiment, the interpolation data obtained by sine curve interpolation are added to the interporation data obtained by linear interpolation. Therefore, it is possible to minimize the deviation of the outputted image data from the image data of the actual sampling point. In addition, the sine curve interpolation can be effected merely by using two adjacent sampling points like linear interpolation. Therefore, it is possible to obtain accurate image data without any increase in the number of sampling points necessary for the interpolation. This results in a simple data processing circuit.

Because of such a small deviation, the displayed image can have a great resolving power. In practice, the sampling frequency fs is normally selected to be four times greater than the sub-carrier frequency fsc of the chroma signal. Therefore, the digital filter circuit can be selected to have a flat frequency characteristic at an angular frequency fc/4(fsc) in order to avoid displayed image deterioration.

Although the sine curve interpolation has been described in connection with the case where the angular distance between two sampling points is $\pi/2$, it is to be noted that the angular distance is not limited in any way to $\pi/2$. For example, the angular distance can be $\pi/3$, $\pi/4$, etc. if necessary. Although the combination of the digital filter circuit and the subtractor is provided to supply the sampling data to the first and second interpolators, it is to be noted that the invention is not limited in any way to this arrangement. For example, each of the first and second interpolators can include an individual filter circuit. In addition, the frequency characteristics of the digital filter circuit are not limited to those represented by Equations (29) and (30). For example, the digital filter circuit can be selected such that the level of the image data D(I+x, J+y) is 1 at an angular frequency fs/3 so as to minimize the displayed image deterioration when the sampling frequency of the image data is selected to be three times greater than the sub-carrier frequency fsc of the chroma signal. Although the invention has been described in connection with two interpolators for linear and sine-curve interpolations, it is to be noted that the invention is not limited to such an arrangement. For example, a third interpolator can be provided in addition to the first and second interpolators. In this case, the interpolated data produced from the third interpolator are added to the interpolated data produced from the first and second interpolators. This is effective to further reduce the deviations from the actual image data. Although the invention has been described in connection with a data processing device for processing two-dimensional image data, it is to be noted that the invention is equally applicable to other data processing devices for obtaining interpolation data of a sampling point based on three- or four-dimensional sampling data. In this case, the number of the sampling data necessary for interpolation is 8 for three-dimensional image data and 16 for four-dimensional image data. Conventional apparatus requires 16 sampling data for three-dimensional image data and 64 sampling data for four-dimensional image data.

Figure 17:
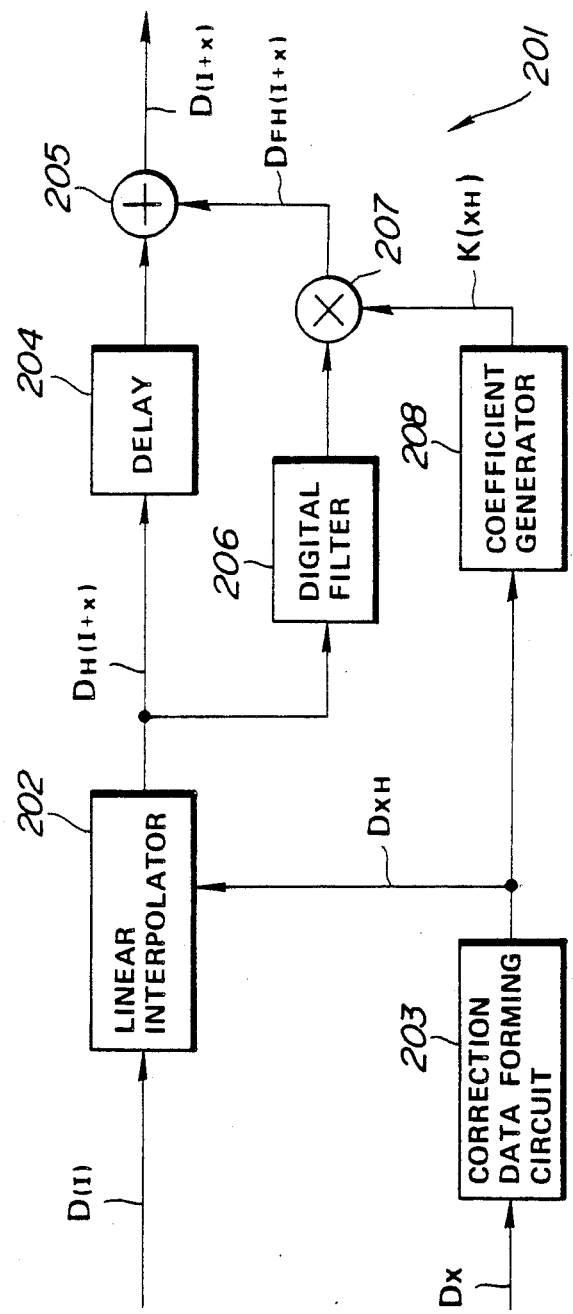
FIG. 17 is a block diagram showing a one-dimensional interpolator circuit which may be used as the interpolator circuit.
Figure 18:
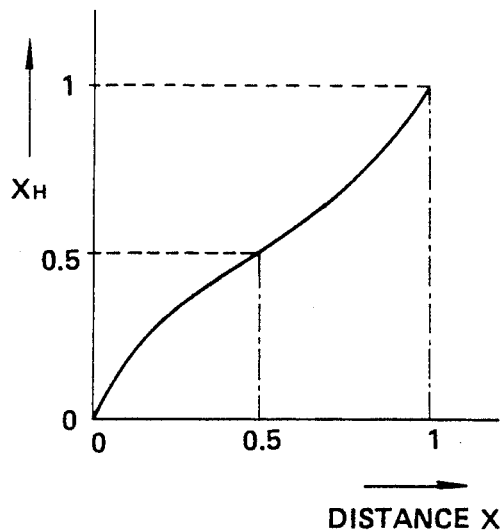
FIG. 18 is a graph showing the characteristic of the correction data forming circuit of the interpolator circuit of FIG. 17.

Referring to FIG. 17, there is illustrated another type of interpolator 6 of FIG. 4. In FIG. 17, the interpolator is generally designated by the numeral 201. For the sake of simplicity of explanation, description will be given of linear interpolation of image data. That is, the interpolator 201 obtains interpolation data of a sampling point P(I) based on the image data D(I) containing the sampling data of the one-dimensional sampling point P(L). The sampling data D(I) of the sampling point P(I) are supplied to a linear interpolator 202. Distance information Dx, which represent the distance x of the sampling point P(I) from a point P(I+x) to be calculated from the sampling point P(I), are supplied to a correction data forming circuit 203 which includes a read only memory. The correction data forming circuit 203 calculates correction data $D_{XH}$ from a relationship programmed into the read only memory. This relationship defines the correction data $D_{XH}$ as a function of the distance information DX, as shown in FIG. 18. The calculated correction data $D_{XH}$ are supplied to the linear interpolation circuit 202. The linear interpolator 202 produces the interpolation data D(I+x) of the point P(I+x) between the sampling points P(I) and P(I+1) based on the value $X_H$ of the correction data $D_{XH}$ represented as:

$$X_H = \frac{1}{\cot\frac{\pi}{2}x + 1} \quad (31)$$

It is preferable that the phase characteristic be flat at a frequency fs/4 (=fsc) since the sampling frequency fs is normally selected to be four times greater than the sub-carrier's frequency fsc of the chroma signal when the sampling data are formed based on a video signal. In this case, the phase characteristic $F_{YD}(\pi/2, x)$ of the ideal phase shifter is represented as:

$$\angle F_{ID}\left(\frac{\pi}{2}, x\right) = -\frac{\pi}{2} x \tag{32}$$

When the value $X_H$ of the correction data $D_{XH}$ is used for linear interpolation, the phase characteristic $\angle FI(\pi/2, X_H)$ is represented as:

$$\angle F_I\left(\frac{\pi}{2}, X_H\right) = \tan^{-1}\frac{X_H}{1 - X_H} \tag{33}$$

From Equations (32) and (33), we obtain:

$$\tan^{-1}\frac{X_H}{1 - X_H} = \frac{\pi}{2} x \tag{34}$$

From Equation (34), we obtain:

$$\frac{X_H}{1 - X_H} = \tan\frac{\pi}{2} x \tag{35}$$

From Equation (35), we obtain:

$$\frac{1}{X_H} - 1 = \cot\frac{\pi}{2} x \tag{36}$$

Equation (35) is solved for $X_H$ as:

$$X_H = \frac{1}{\cot\frac{\pi}{2} x + 1} \tag{37}$$

Accordingly, the linear interpolator 202 can produce a phase characteristic $\angle F1 (\pi/2, x)$ equal to the phase characteristic $\angle F_{ID}(\pi/2, x)$ of the ideal phase shifter at a frequency of fs/4 by performing linear interpolation based on the value $X_H$ of the correction data $D_{XH}$ produced from the correction data forming circuit 203. This value X is represented by Equation (31) which is equal to Equation (37).

It is possible in practice to obtain a phase characteristic sufficient in practice within the frequency band of the sampling data D(I) by making corrections such that the phase characteristic $\angle FI (\pi/2, x)$ is equal to the phase characteristic $\angle F_{ID}(\pi/2, x)$ of the ideal phase shifter.

The linear interpolator 202 produces the interpolation data DH(I+x) through a delay circuit 204 to a summing circuit 205 and also through a digital filter circuit 206 to a multiplier 207 which in turn is connected to the summing circuit 205. The multiplier 207 weights the output of the digital filter circuit 206 by a correction coefficient fed from a correction coefficient generator 208 which generates it based on the correction data $D_{XH}$ fed thereto from the correction data forming circuit 203. The multiplier 207 and the coefficient generator 208 serve to weight the data fed from the digital filter circuit 206 according to the distance x. The delay circuit 204 delays the interpolation data DH(I+x) to coincide with the time at which the interpolation data DH(I+x) arrives at the summing circuit 205 with the time at which the weighted data DFH(I+x) arrives at the summing circuit 205. That is, the interpolation data DH(I+x) are fed to the digital filter circuit 206 which extracts a component of a predetermined frequency. The extracted component is fed to the multiplier 207 where it is weighted by a coefficient determined by the distance x to form correction data DFH(I+x). The correction data DFH(I+X) are added to the summing circuit 205 where they are added to the delayed interpolation data fed thereto from the delay circuit 204 to form image data D(I+x) having a flat frequency characteristic. Assuming now that $|F_F(\pi R)|$ is the amplitude characteristic of the digital filter circuit 206 and the weighting coefficient used in the multiplier 207, the flat frequency characteristic can be obtained when the amplitude characteristic of the data processing circuit 201 is 1; that is, when the following equation is satisfied:

$$(|F_F(\omega R)| \cdot K(x) + 1) \cdot |F_I(\omega R, x)| = 1 \tag{38}$$

Since the linear interpolator 202 uses the value $X_H$ of the correction data $D_{XH}$, the amplitude characteristic $FI(wR, X)$ is represented as:

$$|F_I(\omega R, x_H)| = \sqrt{\{1 + x_H(\cos\omega_R - 1)\}^2 + \{x_H \sin\omega_R\}^2} \tag{39}$$

With the use of a digital filter circuit where the frequency characteristic $|F_F(\pi/2)|$ is 1 at a frequency fs/4, the following equation is obtained from Equation (39) if $\pi/2$ is sibstituted into $\omega R$:

$$\left|F_I\left(\frac{\pi}{2}, x_H\right)\right| = \sqrt{1 - 2x_H + 2x_H^2} \tag{40}$$

From Equations (38) and (40), the following evaluation is obtained:

$$(K(x_H) + 1) \cdot \sqrt{1 - 2x_H + 2x_H^2} = 1 \tag{41}$$

Equation (41) is solved for $K(X_H)$ as:

$$K(x_H) = \frac{1}{\sqrt{1 - 2x_H + 2x_H^2}} - 1 \tag{42}$$

Figure 19:
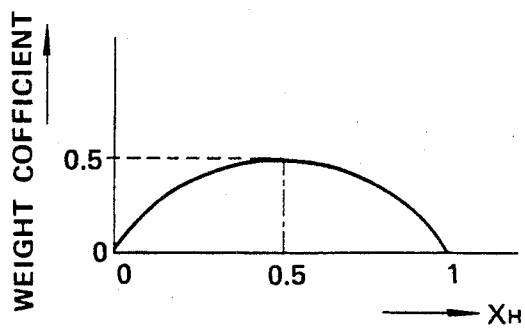
FIG. 19 is a graph showing the characteristic of the coefficient generator used in the interpolator of FIG. 17.

The coefficient generator 208 uses the value $X_H$ of the correction data $D_{XH}$ fed thereto from the correction data forming circuit 203 to produce a weighting coefficient $K(X_H)$ as represented by Equation (42). FIG. 19 shows the relationship between the weighting coefficient and the value $X_H$ of the correction data $D_{XH}$. The weighting coefficient $K(X_H)$ is fed to the multiplier 207. When the weighting coefficient $K(X_H)$ is selected in such a manner, the frequency characteristic $|F_F(\omega R)|$ of the digital filter circuit 206 is represented as:

$$|F_F(\omega R)| = \frac{\frac{1}{|F_I(\omega R, x_H)|} - 1}{\sqrt{1 - 2x_H + 2x_H^2} - 1} \tag{43}$$

In this case, the frequency characteristic $|F_F(\omega R)|$ of the digital filter circuit 206 is selected such that the frequency characteristic of the linear interpolator 202 is flat when the weighting coefficient x is 0.5: that is, when the value $X_H$ of the correction data $D_{XH}$ is 0.5. When $X_H = 0.5$, the frequency characteristic is given as:

$$|F_f(\omega R, 0.5)| = \left|\cos\frac{\omega R}{2}\right| \qquad (44)$$

From Equations (43) and (44), we obtain:

$$|F_F(\omega R)| = \frac{\frac{1}{\left|\cos\frac{\omega R}{2}\right|} - 1}{\sqrt{2} - 1} \qquad (45)$$

Figure 20:
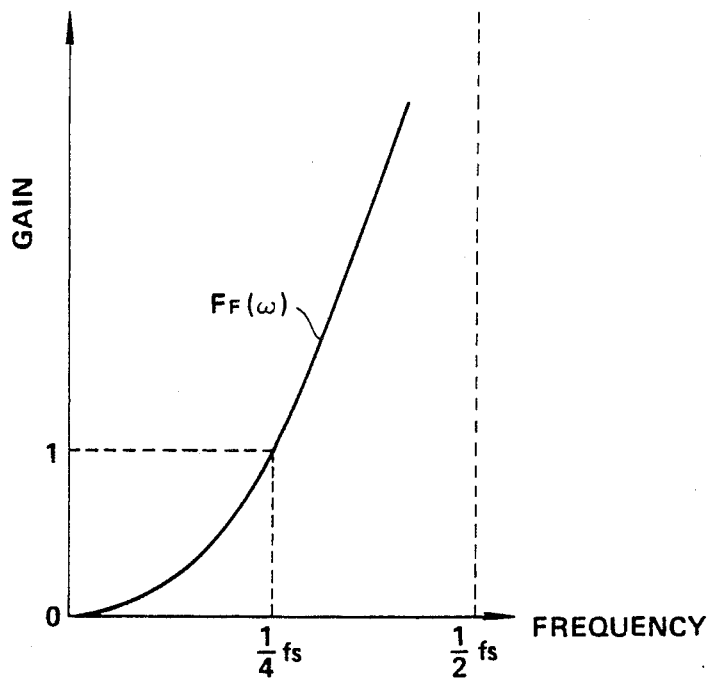
FIG. 20 is a graph showing the frequency characteristic of the digital filter circuit of the interpolator circuit of FIG. 17.

Accordingly, the digital filter circuit can be a high pass filter, the gain of which is 1 at a frequency fs/4 (=fsc) and is infinite at a frequency fs/2 (=2fsc), as shown in FIG. 20. Since the frequency of the sampling data is less than fs/2 in practice, the frequency characteristic at high frequencies can be selected within a range sufficient in practice.

The frequency characteristic of the interpolator 201 arranged as shown in FIG. 17 will be discussed. The digital filter circuit 206 used in practice exhibits a frequency characteristic which deviates from the ideal frequency characteristic as represented by Equation (45). As a result, an error will be introduced into the interpolation data $D(I+x)$ produced from the interpolator circuit 201. First of all, the actual amplitude characteristic $|F_A(\omega R, x)|$ of the interpolator circuit 201 is discussed. From Equations (38), (42) and (39), the following equation is obtained:

$$|F_A(\omega R, X_H)| = (|F_F(\omega R)| \cdot K(X_H) + 1) \cdot |F_1(\omega R, X_H)| \qquad (46)$$

$$= \frac{\left\{|F_F(\omega R)| \cdot \left(\frac{1}{\sqrt{1 - 2X_H + X_H^2}} - 1\right) + 1\right\}}{\sqrt{\{1 + X_H(\cos\omega R - 1)\}^2 + \{X_H\sin\omega R\}^2}}$$

The characteristic at the frequency fs/2 (=2fsc) is discussed. When $\omega R = \pi$, Equation (46) is rewritten as:

$$|F_A(\pi, X_H)| = \frac{\left\{|F_F(\pi)| \cdot \left(\frac{1}{\sqrt{1 - 2X_H + 2X_H^2}} - 1\right) + 1\right\}}{\sqrt{(1 - 2X_H)^2}} \qquad (47)$$

$$= \frac{\left\{|F_F(\pi)| \cdot \left(\frac{1}{\sqrt{1 - 2X_H + 2X_H^2}} - 1\right) + 1\right\}}{(1 - 2X_H)}$$

Figures 21, 22:
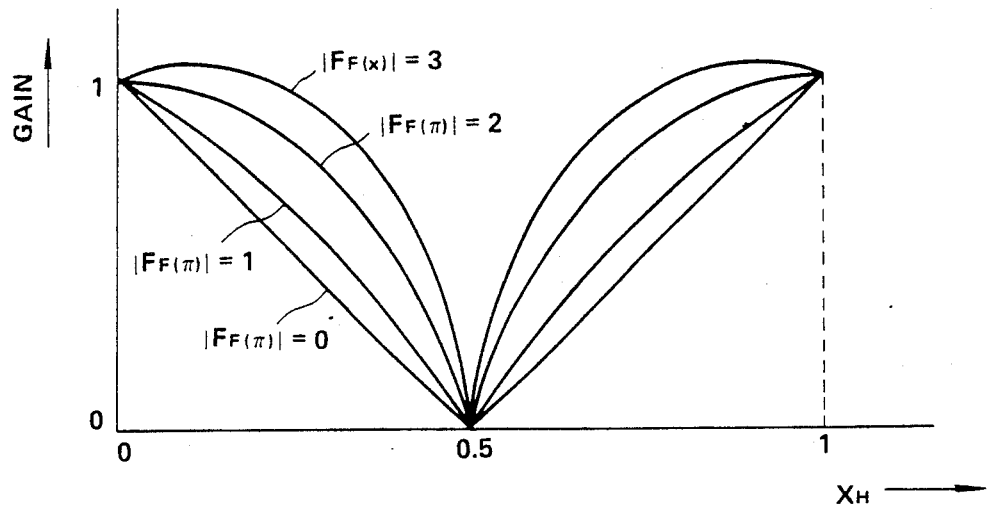
FIG. 21 contains graphs showing the amplitude characteristics of the interpolator circuit of FIG. 17.
FIG. 22 is a table used in explaining the characteristic of the digital filter circuit used in the interpolator circuit of FIG. 17.

FIG. 21 contains characteristic curves obtained when 0, 1, 2 and 3 are successively substituted as the value of $|F_F(\pi)|$ taking the case of the use of a digital filter circuit into account. It is apparent from FIG. 21 that the amplitude characteristic near the frequency fs/2 (=2fsc) is emphasized when it is required to obtain the image data $D(I+x)$ near the sampling point (or when $x=0$) and $|F_F(\pi)|$ has a great value. In order to avoid this, it is preferable to select the gain of the digital filter circuit 206 at the frequency fs/2 to be in a range of two to three.

Figure 23:
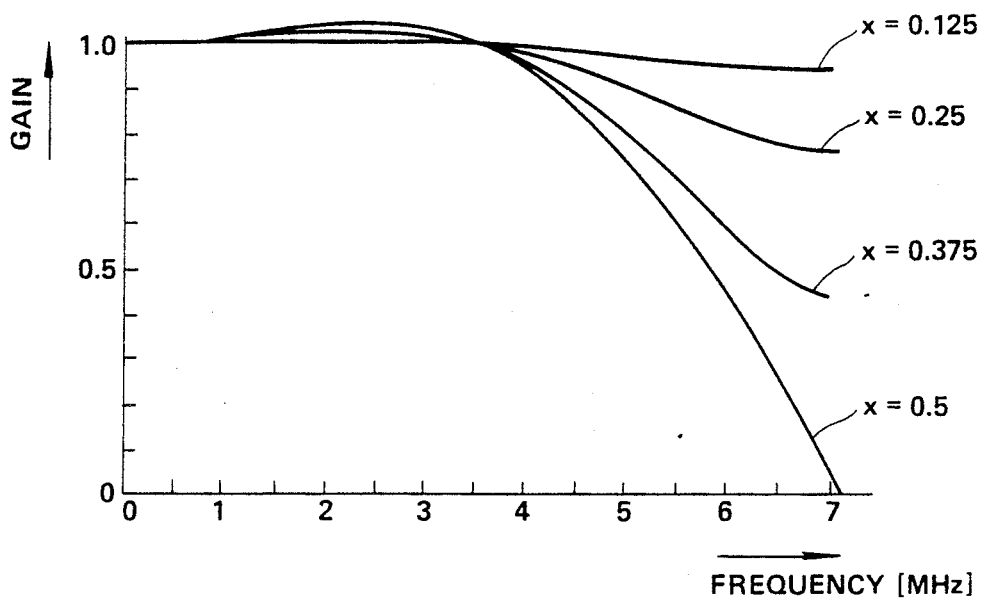
FIGS. 23 to 26 are graphs used in explaining the frequency characteristics of the interpolator circuit of FIG. 17.
Figure 24:
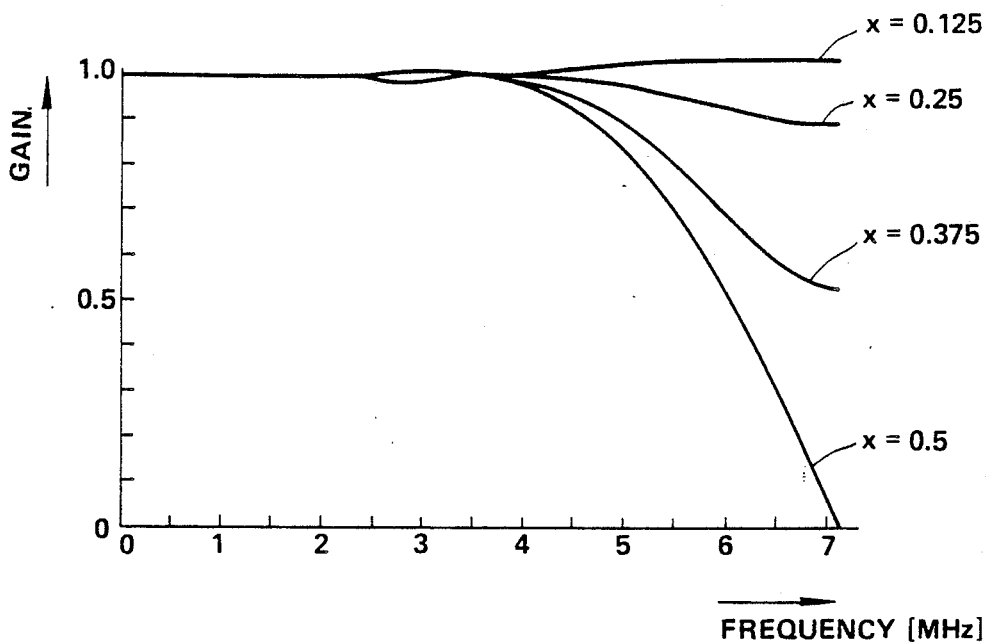
Figure 25:
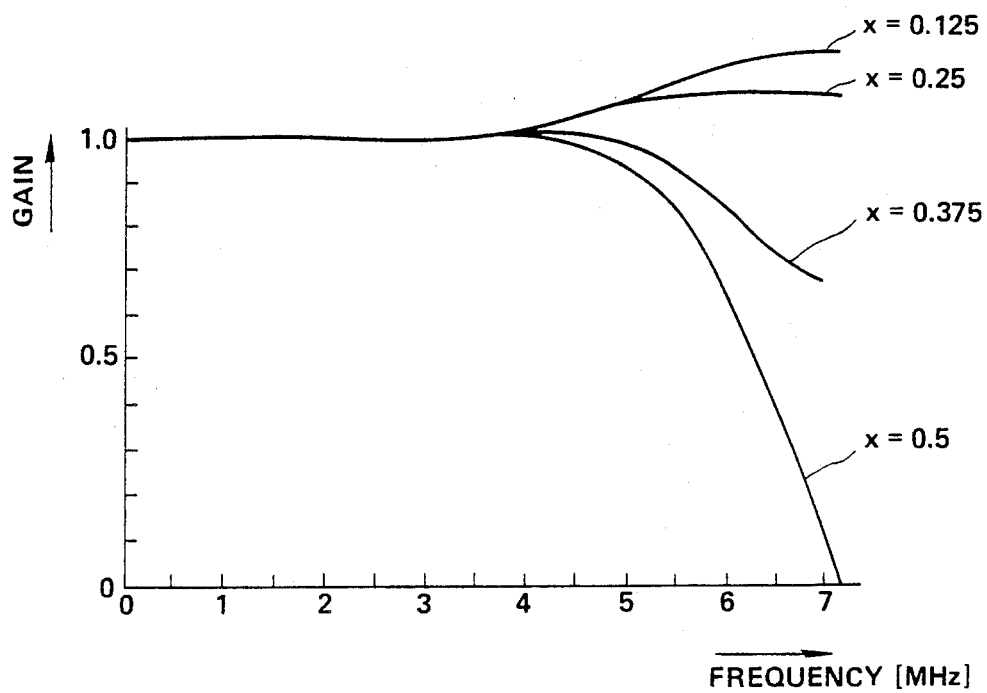
Figure 26:
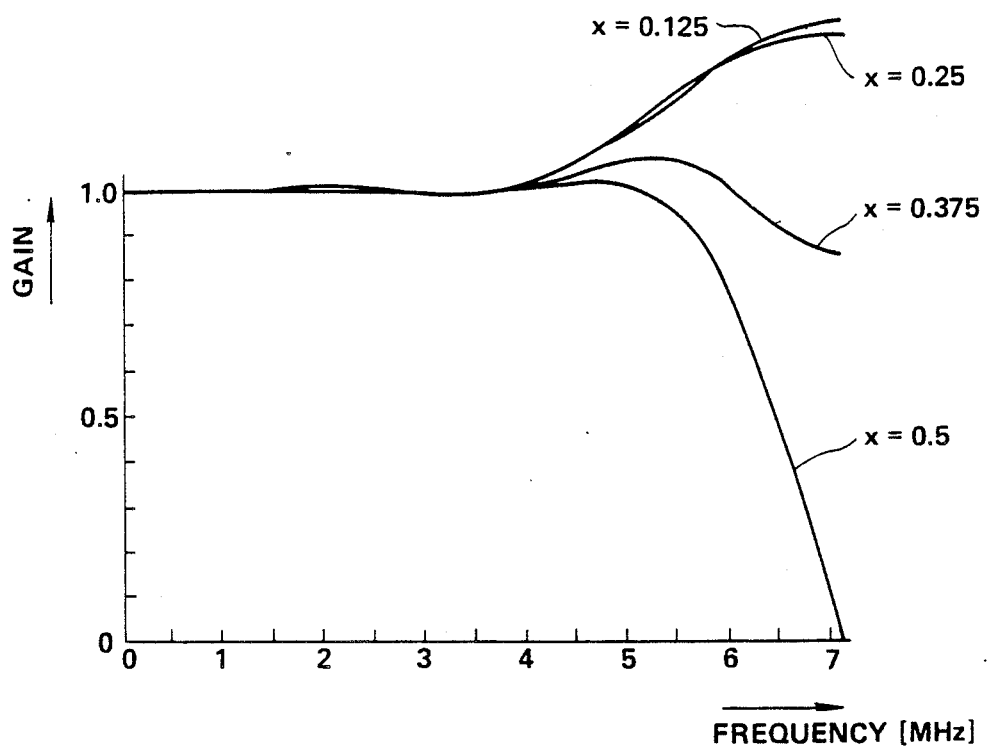

It is now assumed that the digital filter circuit comprises 8-stage shift register circuits selected such that the delay time T is equal to the period of the clock pulses generated at the sampling frequency. When the weighting coefficient applied from the respective shift register circuits to the delay circuit is changed, the frequency characteristic of the interpolator circuit 201 can be changed from one (see FIG. 23) to another (see FIG. 24). Therefore, it is possible to set the frequency characteristic of the interpolating process within a range sufficient in practice based on the frequency band of the sampling data.

The amplitude characteristic $F(\omega R, x)$ of the interpolator circuit 201 is discussed on the assumption that the digital filter circuit 206 is an ideal phase shifter. From Equations (45) and (46), the amplitude characteristic $F(\omega R, x)$ of the interpolator circuit 201 is obtained as:

$$|F_A(\omega R, x_H)| = \qquad (48)$$

$$\frac{\left\{\frac{\frac{1}{\left|\cos\frac{\omega R}{2}\right|} - 1}{\sqrt{2} - 1} \cdot \left(\frac{1}{\sqrt{1 - 2x_H + 2x_H^2}} - 1\right) + 1\right\}}{\sqrt{\{1 + x_H(\cos\omega R - 1)\}^2 + \{x_H\sin\omega R\}^2}}$$

At the frequence fs/4 (=fsc), $\omega R = \pi/4$ and:

$$\left|F_A\left(\frac{\pi}{4}, x\right)\right| = \qquad (49)$$

$$\frac{\left\{\frac{\frac{1}{\left|\cos\frac{\pi}{8}\right|} - 1}{\sqrt{2} - 1} \cdot \left(\frac{1}{\sqrt{1 - 2x_H + 2x_H^2}} - 1\right) + 1\right\}}{\sqrt{\left(1 + x_H\left(\frac{1}{\sqrt{2}} - 1\right)\right)^2 + \left(x_H\frac{1}{\sqrt{2}}\right)^2}}$$

Figure 27:
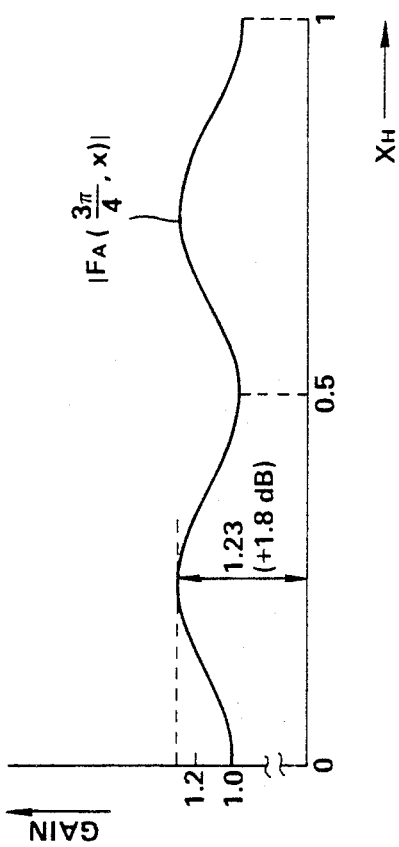
FIGS. 27 and 28 are graphs showing the amplitude characteristics of the interpolator circuit of FIG. 17.

As a result, the obtained amplitude characteristic has such a small error that its maximum gain change of about $-0.07$ [dB] appears near $X_H = 0.15$ at the frequency of fs/4 (=fsc), as shown in FIG. 27.

The amplitude characteristic $|F_A(\omega R, x)|$ at the frequency of 3fs/8 (=3fsc/2) is obtained by substituting $\omega R = 3\pi/4$ into Equation (48):

$$\left|F_A\left(\frac{3\pi}{4}, x\right)\right| = \qquad (50)$$

$$\left\{\frac{\frac{1}{\left|\cos\frac{3\pi}{8}\right|} - 1}{\sqrt{2} - 1} \cdot \left(\frac{1}{\sqrt{1 - 2x_H + 2x_H^2}} - 1\right) + 1\right\}.$$

-continued $$\sqrt{\left(1 + x_H\left(\frac{1}{\sqrt{2}} - 1\right)\right)^2 + \left(x_H \frac{1}{\sqrt{2}}\right)^2}$$

Figure 28:
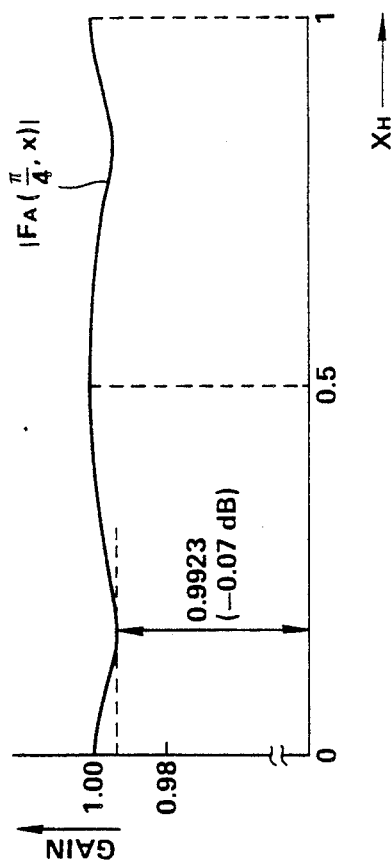

As a result, the obtained amplitude characteristic has such a small error that its maximum gain change of about +1.8 (dB) appears near $X_H=0.2$ at the frequency of 3Fs/8, as shown in FIG. 28. Therefore, it is possible to obtain an interpolator circuit having a small amplitude error.

The phase characteristic of the interpolator circuit 201 is discussed. The phase characteristic of the interpolator circuit 201 is represented as:

$$\angle F_A(\omega_R, x_H) = \tan^{-1} \frac{x_H \sin \omega_R}{1 + x_H(\cos \omega_R - 1)} \quad (51)$$

If Equation (37) is substituted into Equation (51), we obtain:

$$\angle F_A(\omega_R, x_H) = \tan^{-1} \frac{\frac{1}{\cot \frac{\pi}{2} x_H + 1} \sin \omega_R}{1 + \frac{1}{\cot \frac{\pi}{2} x_H + 1}(\cos \omega_R - 1)} \quad (52)$$

The phase characteristic $\angle F(\omega R, X_H)$ at the frequency fs/8 (=fsc/2) is obtained by substituting $\omega R = \pi/4$ into Equation (52):

$$\angle F_A\left(\frac{\pi}{4}, x_H\right) = \tan^{-1} \frac{\frac{1}{\sqrt{2}} \cdot \frac{1}{\cot \frac{\pi}{2} x_H + 1}}{1 + \frac{1}{\cot \frac{\pi}{2} x_H + 1}\left(\frac{1}{\sqrt{2}} - 1\right)} \quad (53)$$

Figure 29:
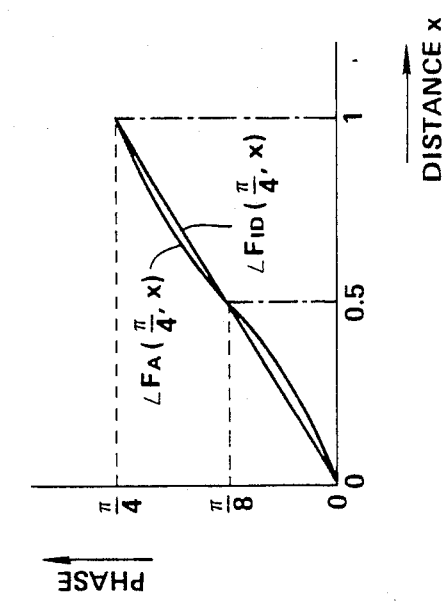
FIGS. 29 and 30 are graphs showing the phase characteristics of the interpolator circuit of FIG. 17.

As a result, the obtained phase characteristic has an error as small as about 1.6 at the greatest with respect to the phase characteristic $\angle F_{ID}(\pi/4, x)$ of the ideal phase shifter at the frequency of fs/8 (=fsc/2), as shown in FIG. 29.

The phase characteristic $\angle F_A(\omega R, x_H)$ at a frequency of 3 fs/8 (=3 fsc/2) is represented by substituting $R=3\pi/4$ into Equation (52):

$$\angle F_A\left(\frac{3\pi}{4}, x_H\right) = \quad (54)$$

$$\tan^{-1} \frac{\frac{1}{\sqrt{2}} \cdot \frac{1}{\cot \frac{\pi}{2} x_H + 1}}{1 - \frac{1}{\cot \frac{\pi}{2} x_H + 1}\left(\frac{1}{\sqrt{2}} + 1\right)}$$

Figure 30:
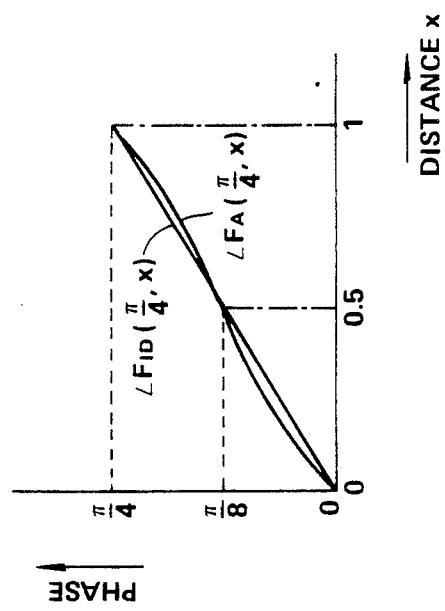

As a result, the obtained phase characteristic $\angle F_A$ ($3\pi/4$, $x_H$) has an error as small as about 11.3 at the greatest with respect to the phase characteristic $\angle F_{ID}$ ($\pi/4$, $x_H$) of the ideal phase shifter at the frequency of 3 fs/8, as shown in FIG. 30. Therefore, it is possible to provide a simple data processor which can provide interpolation data having a small error in its phase characteristic and amplitude characteristic.

Figure 31:
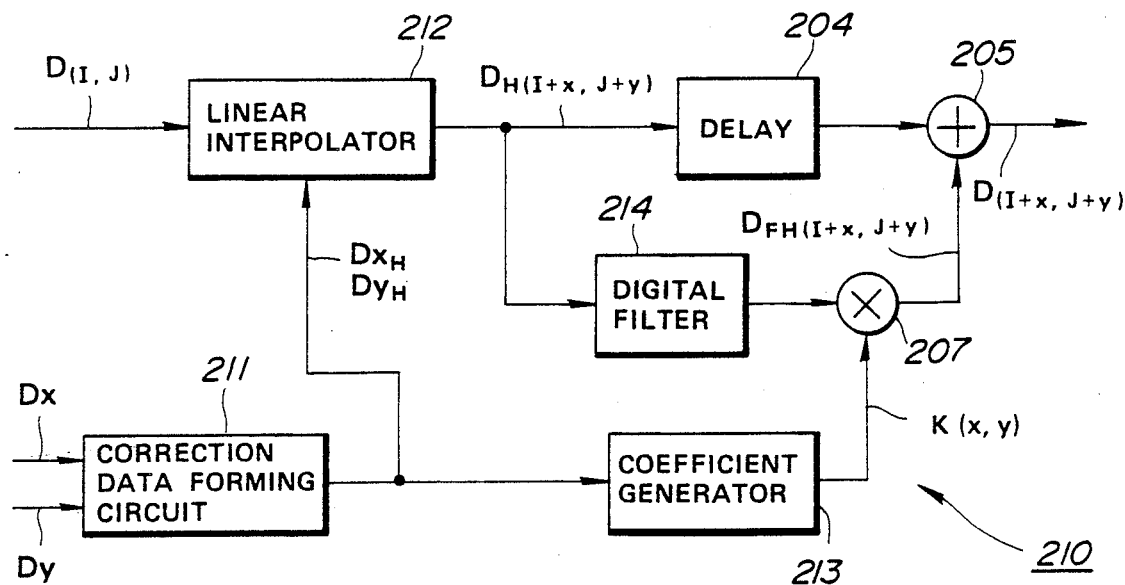
FIG. 31 is a block diagram showing a two-dimensional interpolator circuit which may be used as the interpolator circuit.

Referring to FIG. 31, there is illustrated another type of interpolator circuit for application to two-dimensional image data. Like reference numerals have been applied to FIG. 31 with respect to the equivalent components shown in FIG. 17. The interpolator circuit, which is generally designated by the numeral 210, produces image data of the sampling point P(I, J) based on the image data D(I, J) of the two-dimensional sampling point P(I, J). The correction data forming circuit 211 receives the information indicative of the distance x of the point P(I+x, J+y) away in the X direction from the sampling point (I, J) and the distance y of the point P(I+x, J+y) away in the Y direction from the sampling point P(I, J). The correction data forming circuit 211 produces correction data $D_{XH}$ and $D_{yH}$ to the linear interpolator 212. The correction data $D_{XH}$ and $D_{yH}$ are represented as:

$$x_H = \frac{1}{\cot \frac{\pi}{2} x + 1} \quad (55)$$

$$y_H = \frac{1}{\cot \frac{\pi}{2} y + 1} \quad (56)$$

Figure 32:
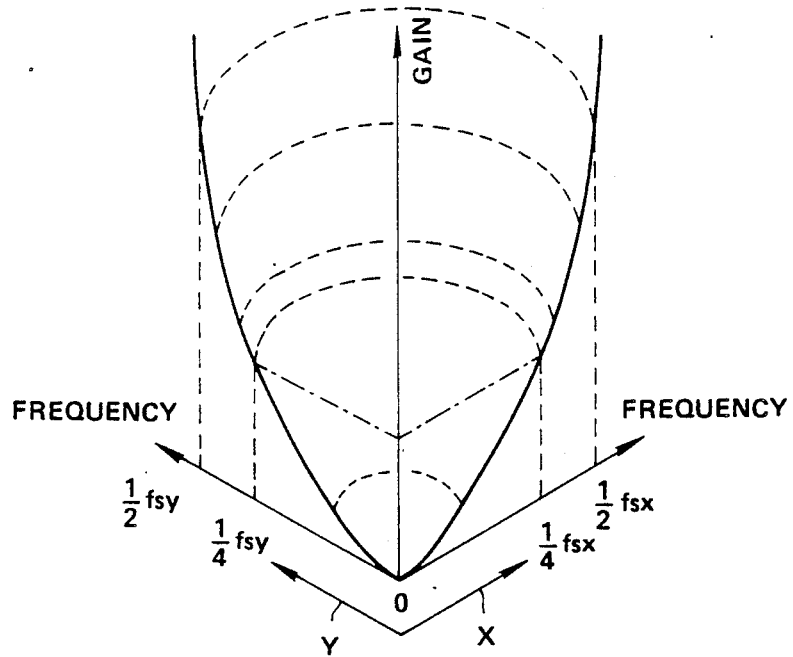
FIG. 32 is a graph showing the frequency characteristic of the digital filter circuit of the interpolator circuit of FIG. 31.

The linear interpolator 212 produces interpolation data DH(I+x, J+y) by interpolating the image data D(I, J) based on the values $x_H$ and $y_H$ of the correction data $D_{XH}$ and $D_{yH}$. The coefficient generator 213 produces a weighting coefficient K(x, y) based on the values $x_H$ and $y_H$ of the correction data $D_{XH}$ and $D_{yH}$. The digital filter circuit 214 comprises a two-dimensional high pass filter, as shown in FIG. 32, for extracting a component of a predetermined frequency from the interpolation data D(I+x, J+y). The extracted component is fed to the multiplier 207 where it is weighted by the weighting coefficient K(x, y) to form data DFH(I+x, J+y). The weighted data are fed to the summing circuit 205 where they are added to the data DH(I+x, J+y) to form image data D(I+x, J+y). The correction data forming circuit 211, the linear interpolator 212, the coefficient generator 213 and the digital filter circuit 214 are selected in a manner similar to that described in connection with the one-dimensional data processing circuit in order to minimize the error introduced on the image data.

The interpolator circuit of FIG. 31 has a simple arrangement which requires only four sampling points in order to obtain one interpolation data. Although linear interpolation is used in this embodiment, it is to be noted that the interpolator circuit can perform interpolation using a sine curve, a curve of secondary degree, or the like in order to further reduce the error introduced in the interpolation data. Although the weighting coefficient is produced based on the correction data, it is to be noted the weighting coefficient can be produced based on the distance information. Although the digital filter circuit and the circuits associated therewith are selected to provide the best amplitude and phase characteristics at a frequency fs/4 where fs is the sampling frequency, it is to be noted that they can be selected to provide the best frequency characteristic in some other desired frequency band. For example, they can be selected to provide the best frequency characteristic at a frequency of fs/3 when the sampling frequency is three times higher than the frequency of the sub-carrier of the chroma signal. In this case, the characteristics of the digital filter circuit and the values of the correction data and the weighting coefficient can be selected to satisfy Equations (34) and (39) when $2\pi/3$ is substituted for $\omega R$.

Although this embodiment has been described in connection with the case where the interpolation data are outputted based on one- or two-dimensional sampling data, it is to be noted that the interporation data may be obtained based on three- or four-dimensional sampling data. In addition, although this embodiment has been described in connection with applications to image data, it is to be noted that the invention is applicable to various applications. For example, the invention is applicable to data processing apparatus for transforming digital audio information of a predetermined sampling frequency into digital audio information of another frequency.

A description will now be given of the detailed arrangement of the aliasing eliminating filter 7 provided for filtering an input image according to the direction of transformation of the input image to eliminate aliasing.

Figure 33:
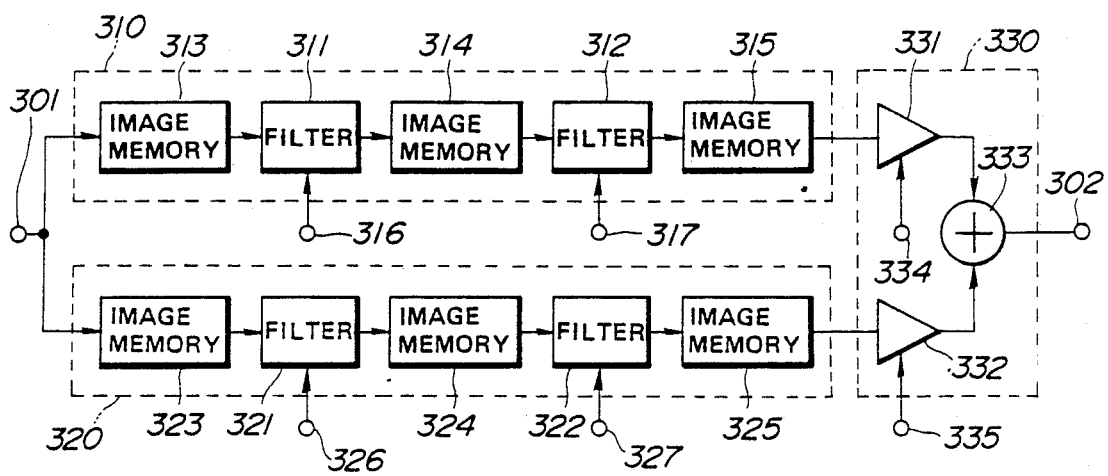
FIG. 33 is a block diagram showing the aliasing eliminating filter used in the image transforming apparatus of the invention.

Referring to FIG. 33, the aliasing eliminating filter includes an input terminal 301 to which input image data are supplied. The input image data are supplied to a first filter unit 310 and also to a second filter unit 320. The first filter unit 310 filters the input image data in the X and Y directions. The second filter unit 310 filters the input image data in directions inclined at non-zero angles $\theta$ and $-\theta$ with respect to the Y axis. For example, the angles $\theta$ and $-\theta$ may be 45 and $-45$, respectively.

Figure 34:
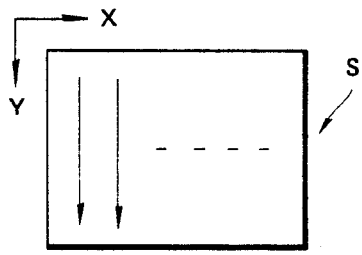
FIG. 34 is a diagram used in explaining the longitudinal filtering process performed in the aliasing eliminating filter.
Figure 35:
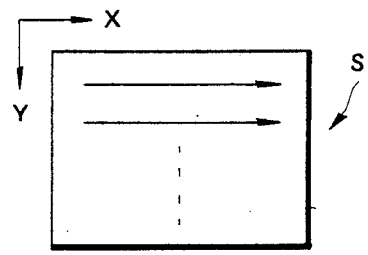
FIG. 35 is a diagram showing the lateral filtering process performed in the aliasing eliminating filter.

The first filter unit 310 includes an image memory 313 which stores the input image data. The stored image data are fed from the image memory 313 to another image memory 314 through a first filter 311 which filters the image data in the Y or vertical direction. The filtering characteristic of the first filter 311 is controlled by a control signal applied to a control terminal 316. For example, the first filter 311 filters the image data by performing calculations using the image data of a plurality of pixels arranged in the Y or vertical direction, as indicated by the arrows of FIG. 34. The filtered image data are stored in the image memory 314. The stored image data are fed from the image memory 314 to another image memory 315 through a second filter 312 which filters the image data fed thereto from the image memory 314 in the X or horizontal direction. The filtering characteristic of the second filter 312 is controlled by a control signal applied to a control terminal 317. For example, the second filter 312 filters the image data by performing calculations using the image data of a plurality of pixels arranged in the X or vertical direction, as indicated by the arrows of FIG. 35. The filtered image data are stored in the image memory 315.

Figure 36:
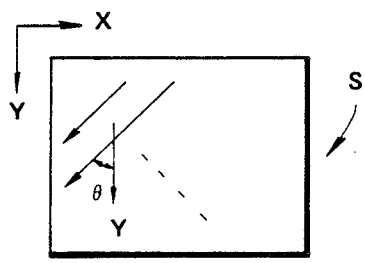
FIG. 36 is a diagram used in explaining the lower left filtering process performed in the aliasing eliminationg filter.
Figure 37:
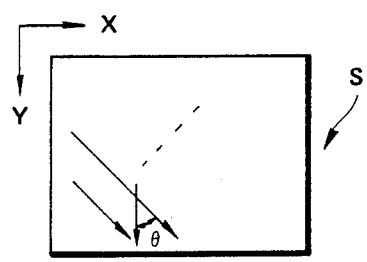
FIG. 37 is a diagram used in explaining the lower right filtering process performed in the aliasing eliminating filter.

The second filter unit 320 includes an image memory 323 which stores the imput image data. The stored image data are fed from the image memory 323 to another image memory 324 through a third filter 321 which filters the image data in a first slant direction inclined at a clockwise angle $\theta$ with respect to the Y azis. This direction is left hand side down and right hand side up. The filtering characteristic of the third filter 321 is controlled by a control signal applied to a control terminal 326. For example, the third filter 321 filters the image data by performing calculations using the image data of a plurality of pixels arranged in the first slant direction, as indicated by the arrows of FIG. 36. The filtered image data are stored in the image memory 324. The stored image data are fed from the image memory 324 to another image memory 325 through a fourth filter 322 which filters the image data fed thereto from the image memory 324 in a second slant direction inclined at a counter-clockwise angle $\theta$ with respect to the Y axis. This direction is left hand side up and right hand side down. The filtering characteristic of the fourth filter 322 is controlled by a control signal applied to a control terminal 327. For example, the fourth filter 322 filters the image data by performing calculations using a plurality of pixels arranged in the second slant direction, as indicated by the arrows of FIG. 37. The filtered image data are stored in the image memory 325.

Figure 38:
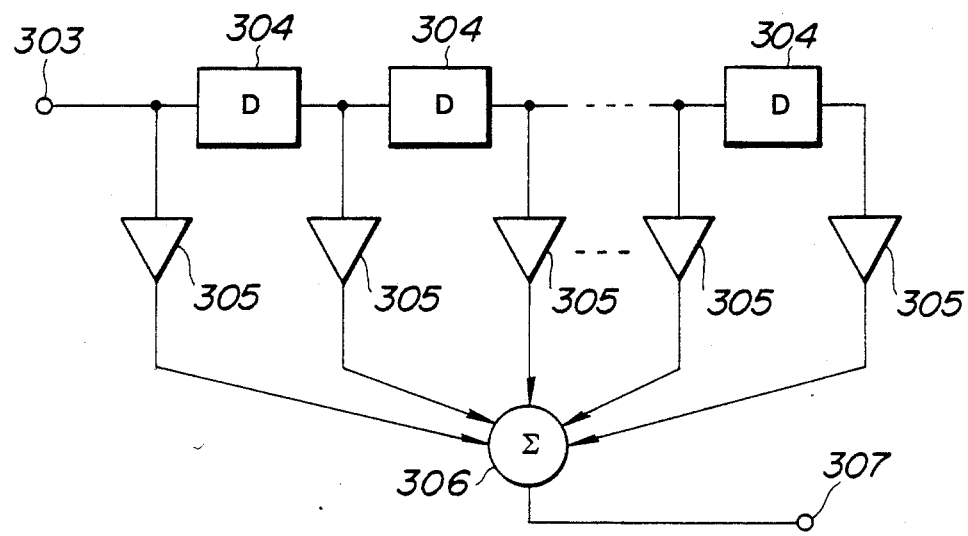
FIG. 38 is a block diagram showing each of the filters of the aliasing eliminating filter of the invention.

Each of the first to fourth filters 311, 312, 321 and 322 can be in the form of a digital filter as schematically shown in FIG. 38. The digital filter has a plurality of delay circuits 304 connected in series to an input terminal 303. The input terminal 303 is connected through a coefficient multiplier 305 to a summing circuit 306. The outputs of the delay circuits 304 are connected to the summing circuit 306 through respective coefficient multipliers 305. The output of the summing circuit 306 is connected to an output terminal 307. Each of the first to fourth filters 311, 312, and 322 can be achieved by adjusting the delay time D of the delay circuits 304 of the digital filter.

Figure 39:
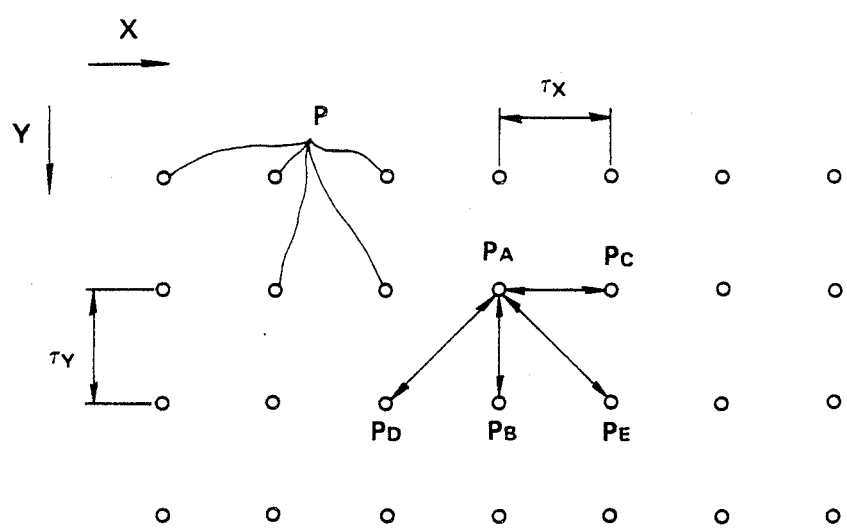
FIG. 39 is a diagram used in explaining the filtering process performed in each of the filters of the aliasing eliminating filter.

The input image data are produced by successively scanning a plurality of pixels arranged in the X and Y directions on a two-dimensional screen, as shown in FIG. 39. For example, raster scan image data are produced by scanning the whole area of the two-dimensional screen in such a manner that the scanning line is shifted from one line to the next line each time one line scanning in the X or horizontal direction is completed. In this case, the sampling clock interval $\tau x$ corresponds to the distance between adjacent pixels arranged in the X direction and the horizontal scanning interval $\tau y$ corresponds to the distance between adjacent pixels arranged in the Y direction.

The first filter 311, which performs calculations for pixels such as pixels pA and pB (FIG. 39) arranged in the Y direction to filter the image data in the Y direction, may be arranged such that the delay time D of the delay circuits 304 is equal to the horizontal scanning interval $\tau y$. The second filter 312, which performs calculations for pixels such as pixels pA and pC (FIG. 39) arranged in the X direction to filter the image data in the X direction, may be arranged such that the delay time D of the delay circuits 304 is equal to the sampling clock interval $\tau x$. The third filter 321, which performs calculations for pixels such as pixels PA and PD (FIG. 39) arranged in the first slant direction to filter the image data in the first slant direction, can be arranged such that the delay time D of the delay circuit 304 is equal to the horizontal scanning interval $\tau y$ minus the sampling clock interval $\tau x$. Similarly, the fourth filter 322, which performs calculations for pixels such as pixels such as pixels pA and pE (FIG. 39) arranged in the second slant direction to filter the image data in the second slant direction, can be arranged such that the delay time D of the delay circuit 304 is equal to the horizontal scanning interval y plus the sampling clock interval $\tau x$. The filtering characteristics of the first to fourth filters 311, 312, 321 and 322 are determined by the degree (for example, reducing ratio) of transformation of the input image.

Returning to FIG. 33, the stored image data are fed from the image memory 315 to a first multiplier 331 and the stored image data are fed from the image memory 325 to a second multiplier 332. The first multiplier 331 weights the inputted image data by a coefficient determined by a control signal applied to a control terminal 334. Similarly, the second multiplier 332 weights the inputted image data by a coefficient determined by a control signal applied to a control terminal 335. The weighted image data are fed from the first multiplier 331 to a summing circuit 333 where they are added to the weighted image data fed from the second multiplier 332. The weighting coefficients used in the first and second multipliers 331 and 332 are determined according to the direction (for example, reducing direction) of transformation of the input image.

It is now assumed that the input image is reduced in a direction inclined at 45 degrees with respect to the Y axis. In this case, it is the conventional practice to filter the image data with the same band limiting amount in both of the X and Y directions. However, this conventional practice is disadvantageous in that the band of the components in a direction inclined at −45 degrees with respect to the Y axis is also limited. According to the invention, it is possible to limit only components in the direction inclined at 45 degrees with respect to the Y axis so as to maintain good image quality by adjusting the third filter 321 to have the greatest band limiting amount, the fourth filter 322 to have no band limiting amount, the first multiplier 331 to have the smallest weighting coefficient, and the second multiplier 332 to have the greatest weighting coefficient.

While this invention has been described in conjunction with specific embodiments thereof, it is evident that many alternatives, modifications, and variations will apparent to those skilled in the art. Accordingly, it is intended to embrace all alternatives, modifications and variations that fall within the scope of the appended claims.

What is claimed is:

1. A method of transforming a video image in the form of minute quadrangular segments, each having four apexes as defined by position coordinates, comprising the steps of:

obtaining first position data for the coordinates of each of the four vertices of respective first minute quadrangular regions of the input image;

obtaining second position data for the coordinates of each of four vertices (corners) of respective second minute quadrangular regions into which the first minute quadrangular regions are to be correspondingly transformed;

calculating parameters corresponding to each relationship between the respective first minute quadrangular regions and the respective second minute quadrangular regions using respective pairs of vectors which are congruent with the respective pair of adjacent sides included in each triangular region divided from the second minute quadrangular regions so as to contain the longer diagonal thereof, the respective pairs of adjacent sides constituting a pair of triangles together with the longer diagonal of each second minute quadrangular; and transforming video information at each point within the respective first minute quadrangular regions into corresponding video information at each point within the respective second minute quadrangular regions using the respective parameters so as to constitute the output video image.

2. Apparatus for transforming input video image data comprising:

first memory means for storing input image data at an address specified by a first write address signal and from which the input image data is read out according to a first read address signal;

means for generating the first write address signal;

means for obtaining respective first position data with respect to each of the coordinates of four vertices (corners) of respective first minute quadrangular regions to be divided from the input video image;

means for obtaining respective second position data with respect to each of the coordinates of four vertices (corners) of respective second minute quadrangular regions into which the first minute quadrangular regions are to be correspondingly transformed by calculating using one or more respective transforming functions;

means for calculating respective parameters corresponding to the relationships between each first minute quadrangular region and a corresponding second minute quadrangular region using two respective pairs of vectors each of which are congruent with respective different pairs of adjacent sides of each second minute quadrangular region, the respective pairs of adjacent sides constituting a pair of triangles together with the longer of the two diagonals of the second minute quadrangular region;

second memory means for storing output image data at an address specified by a second write address signal and from which the output image data is readout under the control of a second read address signal so as to produce output video image data;

means for generating the second write address signals for each sample within each second minute quadrangular region and for generating first read address signals for each sample within each first minute quadrangular region using the respective parameters and the second write address signals; and means for generating the second read address signal.

3. Apparatus for interpolating data at respective interpolation points from data sampled at respective sampling points comprising:

means for receiving data corresponding to the respective distances from the respective sampling points to the respective interpolation points and for producing compensating distance data according to these respective distances;

calculating means provided with the respective sampling data and the compensating distance data and for producing the respective interpolation data using the respective sampling data and the compensating distance data;

filter means provided with the respective interpolation data for producing respective output data having a predetermined frequency component from the respective interpolation data;

first adding means provided with the respective output data of the filter means and respective weighting data corresponding to the respective distances from the respective sampling points to the respective interpolation points and for producing first respective output data by adding together the respective weights to the respective output data of the filter means;

second adding means provided with the respective interpolation data and the respective output data of the first adding means and for producing second respective output data by adding together the first respective output data of the first adding means and the respective interpolation data.

4. Apparatus for interpolating data at respective points from data sampled at respective sampling points comprising:
- first filtering means, having first filter characteristics and provided with the respective sampling data, for filtering the respective sampling data and for producing first output data;
- second filtering means, having second filter characteristics and provided with the respective sampling data, for filtering the respective sampling data and for producing second output data;
- first interpolation means provided with the first output data of the first filtering means for producing first interpolation data using the first output data of the first filtering means and a linear interpolation method;
- second interpolation means provided with the second output data of the second filtering means for producing second interpolation data using the second output data of the second filtering means and a sinusoidal interpolation method;
- adding means for adding together the first interpolation data from the first interpolation means and the second interpolation data from the second interpolation means.

5. Apparatus for filtering an input video image, whereby the input video image is transformed into an output video image, comprising:
- a first filtering system being provided with the input video image data for producing first output data filtered in a vertical direction and a horizontal direction, the first filtering system having first filtering means for filtering input data thereof in the vertical direction and second filtering means for filtering input data thereof in the horizontal direction;
- a second filtering system being provided with the input video image data for producing second data which is filtered in a first slant direction of left hand side down and right hand side up and a second slant direction of left hand side up and right hand side down, the second filtering system having third filtering means for filtering the input data thereof in the first slant direction and a fourth filtering means for filtering the input data thereof in the second slant direction;
- whereby the first to fourth filtering means are controlled in the filter characteristics thereof according to the magnitudes of the transformations;
- first weighting means for weighting the first output data of the first filtering system and for producing a first weighted output signal;
- second weighting means for weighting the second output data of the second filtering system and for producing a second weighted output signal;
- whereby the first and second weighting means are controlled in the weighting thereof according to the directions of the transformation; and
- adding means for adding together the first weighted output data and the second weighted output data and for producing output video image data therefrom.

* * * * *